United States Patent
Ohiwa et al.

(10) Patent No.: US 6,552,453 B2
(45) Date of Patent: Apr. 22, 2003

(54) MAGNETIC POLE POSITION DETECTOR FOR AN ELECTRIC MOTOR

(75) Inventors: Shoji Ohiwa, Yono (JP); Kazuo Ohnishi, Kiryu (JP); Atushi Yamamoto, Yono (JP); Shinji Shimizu, Kiryu (JP); Youji Unoki, Kiryu (JP); Yukinori Kurita, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 09/861,706

(22) Filed: May 22, 2001

(65) Prior Publication Data

US 2002/0047348 A1 Apr. 25, 2002

(30) Foreign Application Priority Data

May 23, 2000 (JP) ........................................ 2000-150834
Dec. 7, 2000 (JP) ........................................ 2000-372830
Mar. 13, 2001 (JP) ........................................ 2001-070646

(51) Int. Cl.$^7$ .......................... H02K 7/00; H02K 11/00; H02K 1/22
(52) U.S. Cl. .................. 310/68 B; 310/49 R; 310/112; 310/114; 324/207.25
(58) Field of Search .............................. 310/49 R, 67 R, 310/68 B, 216, 268, 254, 168, 112, 114; 318/254, 138, 439, 696, 685, 115, 135; 324/207.25, 207.22, 174

(56) References Cited

U.S. PATENT DOCUMENTS 4,099,106 A * 7/1978 Nikaido ...................... 310/114
5,032,750 A * 7/1991 Hayashi .................... 310/68 B
5,142,175 A * 8/1992 Watanabe .................... 310/112
5,239,218 A * 8/1993 Hashimoto et al. ....... 310/68 B
5,394,042 A * 2/1995 Maestre ....................... 310/114
6,005,320 A * 12/1999 Kim et al. ................... 310/114

FOREIGN PATENT DOCUMENTS

| JP | 7174583 | 7/1995 |
|----|---------|--------|
| JP | 1146498 | 2/1999 |

* cited by examiner

Primary Examiner—Tran Nguyen
(74) Attorney, Agent, or Firm—Birch, Stewart, Kolasch & Birch, LLP

(57) ABSTRACT

The magnetic pole position detector for an electric motor comprises a detection rotor, a detection stator, and magnetic flux concentration tips and magneto electro transducers. The detection rotor is fixed to an axis of rotation of the motor and comprised of disc-like rotors having first toothlike protrusions and a permanent magnet. The disc-like rotors are assembled so as to make the first toothlike protrusions coincide in the axial direction and the permanent magnet is fixed between the disc-like rotors. The detection stator is comprised of stator cores comprised of an annular yoke and stator teeth formed at regular intervals on the former. Second toothlike protrusions are formed on the inner end of the stator teeth. The stator cores are assembled with a gap in the axial direction so as to make respective second toothlike protrusions coincide in the axial direction. The magnetic flux concentration tips and the magneto electro transducers are placed in the gaps in the axial direction. The detection rotor and the detection stator are assembled with a gap in the radial direction. The magnetic pole position is obtained by detecting the magnetic flux flowing through the stator teeth that varies in accordance the rotation of the detection rotor.

26 Claims, 17 Drawing Sheets

MAGNETIC POLE POSITION DETECTOR FOR AN ELECTRIC MOTOR

BACKGROUND OF THE INVENTION

1. Field of the Invention

This invention relates to a magnetic pole position detector for an electric motor, and particularly to a magnetic pole position detector for an electric motor with multipolar rotors.

2. Description of the Prior Art

Rotary motion of a step motor is regulated by a frequency of input pulses for controlling the motor. However, when a high load is applied to the motor, or the motor is rapidly accelerated and/or the motor is running at a high rotational speed, it often occurs that the motor steps out and an abnormal vibration is caused to the rotation of the rotor, since the rotor becomes unable to correctly follow the command pulse.

Recently, a closed-loop drive of a step motor has been adopted and the cause of the step out has been reduced to a certain degree, however, the problem of the step out has not been settled yet in principle.

If a step motor can work as a brushless DC motor to avoid the step out of the motor as mentioned above, then the advantages of both the step motor and the brushless DC motor can be utilized and the stable rotation of the step motor can be held even at the starting of the motor or at rapid changes of the load being applied.

In order to make a step motor work as a brushless DC motor, it is necessary to detect the magnetic pole positions of the rotor of the step motor and to supply commutation signals that give a proper electrical angle to the motor winding.

Many methods to make a hybrid step motor work as a brushless DC motor have been proposed in which an encoder is attached directly to a rotation axis of the motor, the encoder signal is synchronized with the magnetic pole position of the rotor of the motor and the synchronized encoder signal is used as the commutation signal.

Further, methods for detecting a position of a multipolar rotor using low-priced Hall effect devices instead of a high-priced encoder are disclosed in Unexamined Patent Publication Nos. 7-174583 and 9-201206 for examples.

In order to lower the vibration of a motor, it is advantageous to make the step angle of the rotor very narrow. However, if the step angle of the rotor is made very narrow, then the number of magnetic poles of the motor as a brushless DC motor will become excessively large. For example, a three-phase step motor with a step angle of 0.60 has 200 magnetic poles. In order to make a step motor work as a brushless DC motor, it is necessary to detect the magnetic pole positions of 200 magnetic poles with high accuracy.

Encoder signals are utilized as commutation signals in the above mentioned system comprising a step motor and an encoder. Accordingly, it is necessary to make the output pulse position of the encoder coincide with the magnetic pole position of the rotor of the motor. However, in case that a number of magnetic poles exist, positioning of the encoder with the axis of the rotor with precise mechanical angle is quite difficult when the former and the latter are connected with each other. Further, fine adjustment of the positioning requires a long time even for a motor with relatively larger step angle.

In the above mentioned invention disclosed in the Unexamined Patent Publication No. 7-174583 in which Hall effect devices are used, a magnetic drum having magnetic poles of which number is equal to that of a step motor is fixed to the axis of the motor, magnetism is collected by two pieces of sensor cores arranged with an angle between them, and the variation in magnetic flux is detected by the Hall effect devices.

Also in this method, it is necessary to make the position of the magnetic pole of the magnetic drum coincide with the magnetic pole position of the rotor of the motor. Accordingly, the above mentioned problem concerning the precision of the positioning in mechanical angles remains unsolved. Further, positioning of two pieces of sensor cores is annoying.

Further, in the above mentioned invention disclosed in the Unexamined Patent Publication No. 11-046498, since multipolar magnet is also required, positioning of the multipolar magnet with the rotor of the motor is unavoidable.

SUMMARY OF THE INVENTION

It is an object of the present invention to solve the above mentioned problems and to provide a magnetic pole position detector for an electric motor which is capable of obtaining commutation signals with high accuracy at a low price.

According to a preferred embodiment of the present invention, there is provided a magnetic pole position detector for an electric motor comprising a detection rotor, a detection stator, magnetic flux concentration tips and magneto electro transducers, the detection rotor is fixed to an axis of rotation of the electric motor and comprised of a pair of disc-like rotors having a plurality of first toothlike protrusions on their circumferences and a permanent magnet of which N-S pole is in the axial direction of the electric motor and the diameter of which is smaller than those of the disc-like rotors, the disc-like rotors are assembled concentrically with each other so as to make respective first toothlike protrusions coincide with each other in the axial direction, the permanent magnet is fixed concentrically between the disc-like rotors, the detection stator is comprised of a pair of stator cores, the stator core is comprised of an annular portion and a plurality of stator teeth for collecting magnetic flux flowing through the first toothlike protrusions of the detection rotor, the stator teeth are formed at regular intervals on the inner circumference of the annular yoke, each of the stator teeth has inner end portion on which a plurality of second toothlike protrusions are formed, the stator cores are assembled concentrically with each other with a gap in the axial direction between them so as to make respective second toothlike protrusions of the stator teeth coincide with each other in the axial direction, the magnetic flux concentration tips are placed in the gaps in the axial direction for concentrating magnetic flux in the gaps in the axial direction, the magneto electro transducers are placed in the gaps in the axial direction for transforming the magnetic flux into electrical signals, the detection rotor and the detection stator are assembled so as to make the first toothlike protrusions of the detection rotor and the second toothlike protrusions of the stator teeth of the detection stator oppose with each other with a gap in the radial direction of the electric motor between them, wherein the magnetic pole position of the electric motor is detected by measuring the magnetic flux flowing through the stator teeth that varies in accordance with the rotation of the detection rotor.

The magnetic pole position detector for an electric motor according to the present invention makes it possible to accurately detect a magnetic pole position of a rotor of a hybrid step motor with minute step angles when the motor works as a brushless DC motor. The magnetic pole position detector for an electric motor according to the present invention has simple structure easy to be constructed at a low price.

An motor equipped with the magnetic pole position detector for an electric motor according to the present invention can work with less fluctuation in rotational speed, with enlarged operating range and with higher operational efficiency, and thus the scope of its use can be expanded.

BRIEF DESCRIPTION OF THE DRAWINGS

FIGS. 3-1 to 3-3 are schematic illustrations showing flows of magnetic flux loop.

FIGS. 12-1 to 12-3 are schematic illustrations showing flows of magnetic flux loop in the direction of X–X' line in FIG. 11.

DETAILED DESCRIPTION OF THE INVENTION

Figure 1:
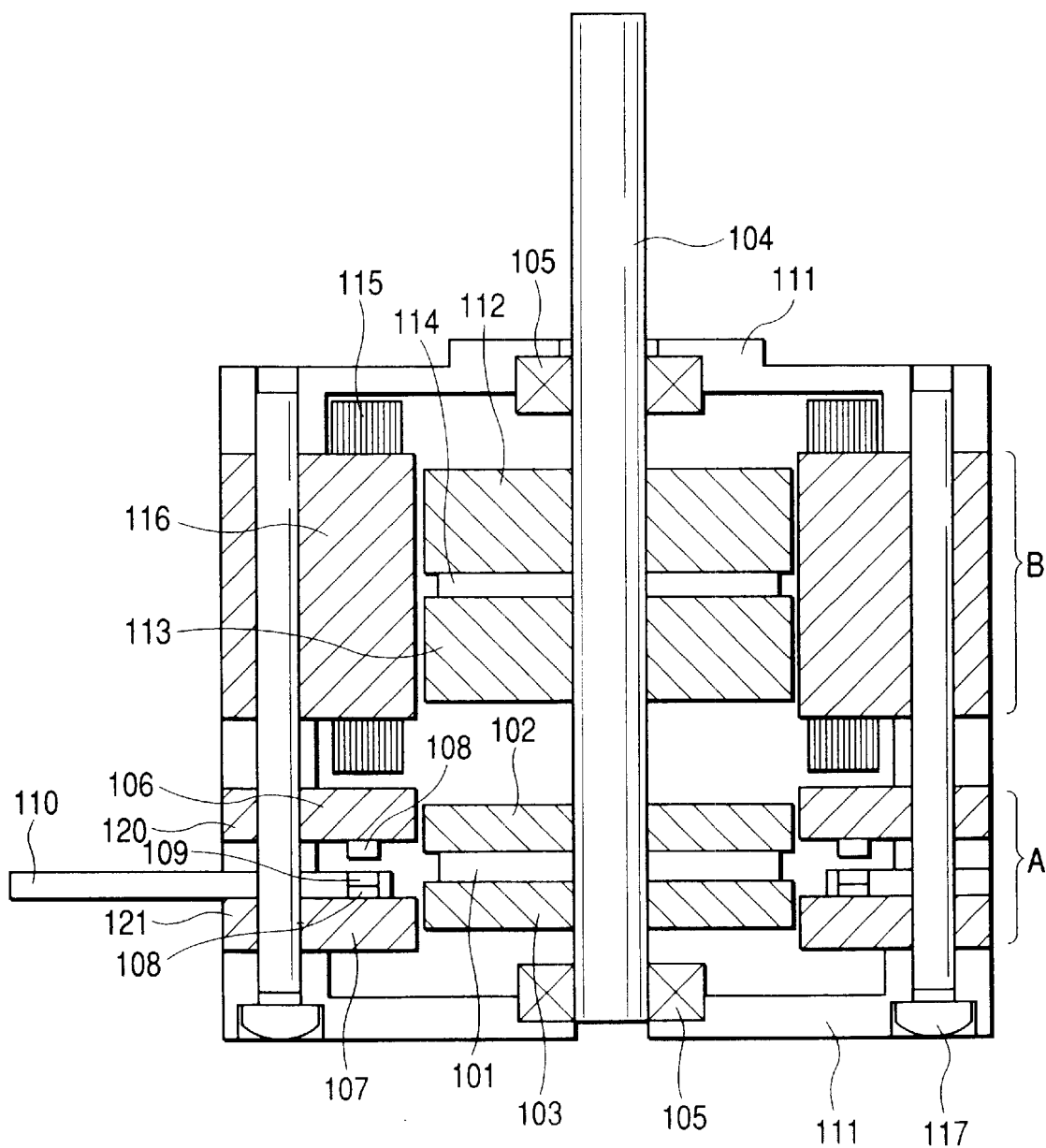
FIG. 1 is a cross-sectional view of the first embodiment of the magnetic pole position detector for an electric motor according to the present invention.

Preferred embodiments of the present invention are explained referring to the drawings attached.

[First Embodiment]

FIG. 1 is a cross-sectional view of the first embodiment of the magnetic pole position detector for an electric motor according to the present invention. The magnetic pole position detectors for an electric motor A is incorporated into a motor B that is a hybrid step motor.

A rotor part of the motor B is composed of a first motor rotor core 112 and a second motor rotor core 113 having toothlike protrusions of which protrusions and recessions are inverse to those of the first motor rotor core 112, and a motor permanent magnet 114 with single-pole magnetization fixed between the first motor rotor core 112 and the second motor rotor core 113. A motor stator core 116 to which motor windings 115 are attached are placed around the rotor part. An axis of rotation 104 of the motor is rotatably attached to a motor housing 111 with ball bearings 105. The whole assembly is assembled with bolts 117.

A detection rotor of the magnetic pole position detector for an electric motor A is composed of a first disc-like rotor 102 of which the center portion is fixed to the axis of rotation 104 of the motor, a second disc-like rotor 103 of which the center portion is also fixed to the axis of rotation 104 of the motor, and a permanent magnet 101 with single-pole magnetization of which N-S pole direction coincides with the direction along the axis of rotation. The permanent magnet 101 is fixed between the first disc-like rotor 102 and the second disc-like rotor 103. The first disc-like rotor 102 and the second disc-like rotor 103 have a plurality of first toothlike protrusions (not shown in the figure) on their circumferences. The first disc-like rotor 102 and the second disc-like rotor 103 are assembled with each other so as to make each of the first toothlike protrusions coincide in the axial direction.

A detection stator is composed of a first stator core and a second stator core. The first stator core is composed of a first annular yoke portion 120 and a plurality of first stator teeth 106 formed at regular intervals on the inner circumference of the first annular yoke portion 120 and having inner end portions on which a plurality of second toothlike protrusions (not shown in the figure) are formed. The second stator core is composed of a second annular yoke portion 121 and a plurality of second stator teeth 107 formed at regular intervals on the inner side of the second annular yoke portion 121 and having inner end portions on which a plurality of second toothlike protrusions (not shown in the figure) are formed. The first stator core and the second stator core are assembled opposing with each other with a gap in the axial direction between them so as to make respective protrusions of the second toothlike protrusions coincide with each other in the axial direction. Magnetic flux concentration tips 108 formed of a magnetic material, Hall effect devices 109 that are magneto electro transducers transforming magnetic field intensity into electric signals and a printed circuit board 110 for mounting the Hall effect devices 109 are placed in the gaps between the first stator teeth 106 and the second stator teeth 107.

The first disc-like rotor 102 and the second disc-like rotor 103 of the magnetic pole position detector for an electric motor A as well as the first motor rotor core 112 and the second motor rotor core 113 of the motor B are identical in plan views, though they differ in thickness, and are formed by press working using an identical die.

Similarly, the first stator core and the second stator core of the magnetic pole position detector for an electric motor A as well as the motor stator 116 of the motor B are identical in plan views, though they differ in thickness, and are formed by press working using an identical die.

Figure 2:
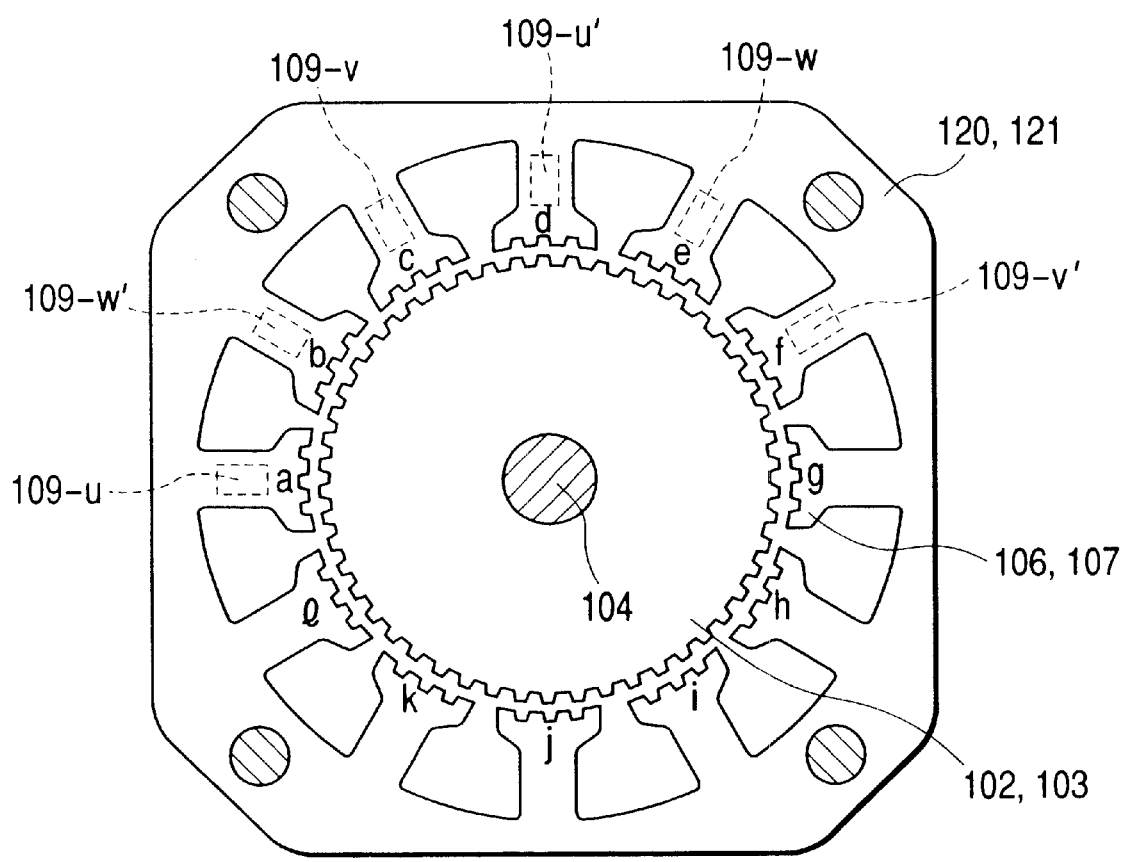
FIG. 2 is a top view of the first embodiment of the magnetic pole position detector for an electric motor according to the present invention in which the magnetic pole position detector is used for detecting magnetic pole positions of a three-phase motor.

FIG. 2 is a top view of the first embodiment of the magnetic pole position detector for an electric motor according to the present invention in which the magnetic pole position detector is used for detecting magnetic pole positions of a three-phase motor. The detection stator is placed surrounding the detection rotor comprising the first disc-like rotor 102 and the second disc-like rotor 103 having a plurality of first toothlike protrusions formed on the circumference, with a gap in the radial direction between the detection rotor and the detection stator. The first stator teeth 106 and the second stator teeth 107 each having the second toothlike protrusions on their inner end portions are formed on the inner circumferences of the annular yoke portions 120, 121. The Hall effect devices 109 are placed in the gaps in the axial direction between the first stator teeth 106 and the second stator teeth 107.

Each of the first stator core and the second stator core shown in FIG. 2 has twelve pairs of stator teeth as indicated by a to I in the figure. Assuming that the detection rotor is rotated in clockwise, magnetic reluctance variation in the gap in the radial direction between the detection rotor and the first stator teeth 106 and the second stator teeth 107 at the stator teeth position b appears later by an electrical angle of 60° relative to that at the stator teeth position a. Likewise, each of the magnetic reluctance variations at the stator teeth positions c to I appears successively later by an electrical angle of 60°.

Accordingly, three phase signals U, V, W with 120° phase difference in electrical angle between them can be detected by a U-phase Hall effect device 109-*u* placed at the stator teeth position a, a V-phase Hall effect device 109-*v* placed at the stator teeth position c and a W-phase Hall effect device 109-*w* placed at the stator teeth position e.

Figures 1, 3:
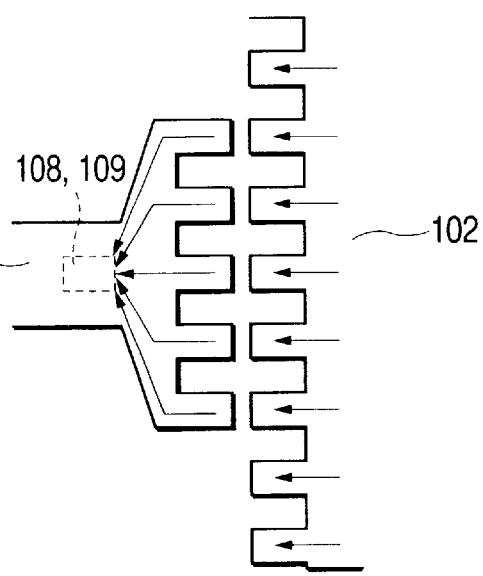
Figures 2, 3:
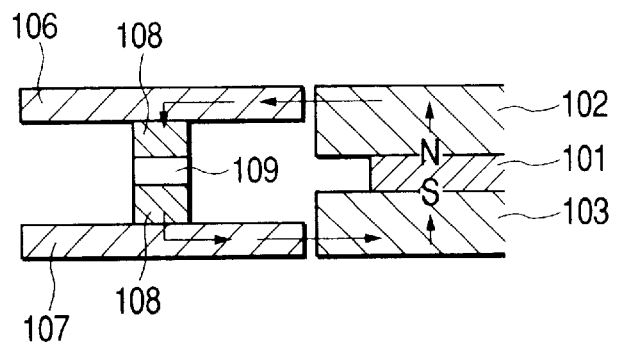
Figure 3:
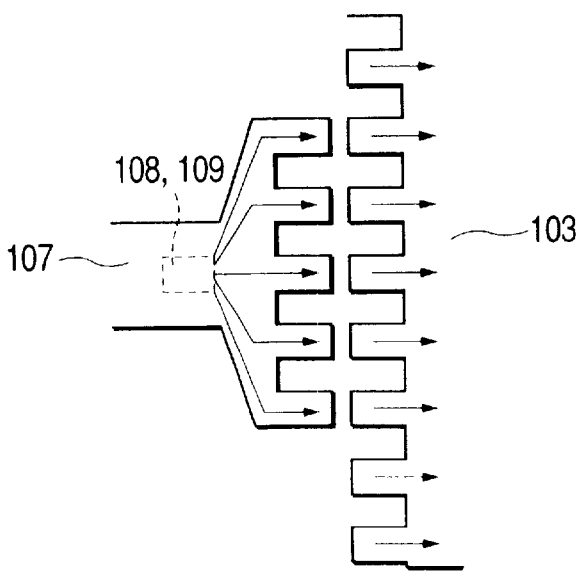

FIGS. 3-1 to 3-3 are schematic illustrations showing flows of magnetic flux loop generated from the permanent magnet 101 of the detection rotor. In these figures, FIG. 3-1 is a top view, FIG. 3-2 is a vertical sectional view, and FIG. 3-3 is a bottom view. The magnetic flux generated from the permanent magnet 101 flows through the first toothlike protrusions formed on the circumference of the first disc-like rotor 102 of the detection rotor, the gap in the radial direction and the second toothlike protrusions formed on the inner end of the first stator tooth 106. Then the magnetic flux converges in the first stator tooth 106. The magnetic flux further flows through the Hall effect device 109 held between a pair of magnetic flux concentration tips 108, the second stator tooth 107, the gap in the radial direction and the first toothlike protrusions of the second disc-like rotor 103 of the detection rotor, then returns to the permanent magnet 101.

FIGS. 3-1 to 3-3 show an occasion when the magnetic reluctance between the detection rotor and the stator teeth is at minimum. As the detection rotor rotates, the magnetic reluctance varies. As the result, magnetic field intensity applied to the Hall effect device 109 also varies.

Figure 4:
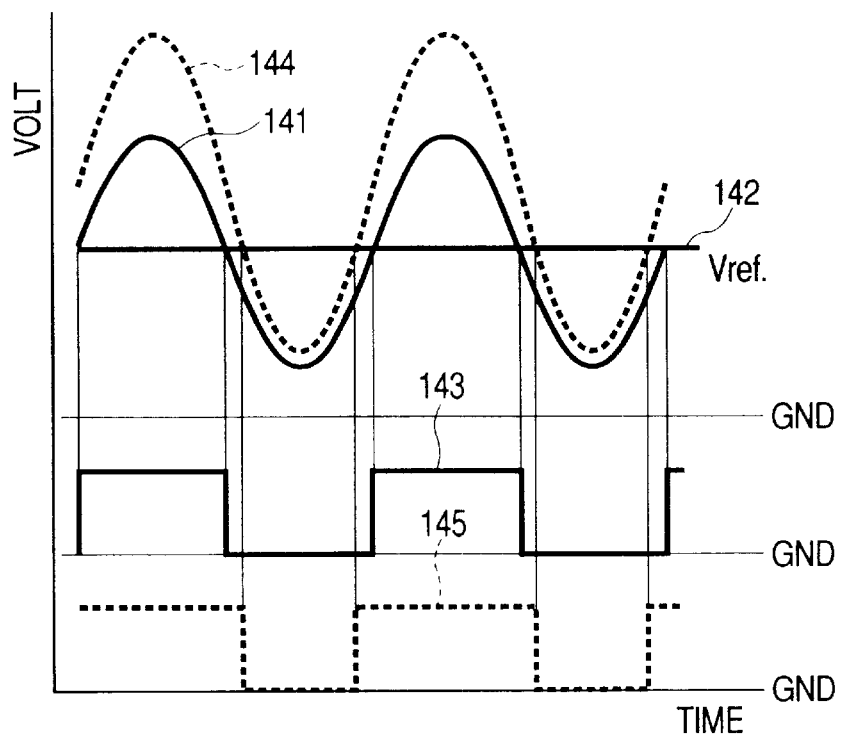
FIG. 4 is a graph illustrating a method for obtaining a commutation signal of a U-phase from an output voltage wave of a Hall effect device.

FIG. 4 is a graph illustrating a method for obtaining a commutation signal of U-phase from an output voltage wave of the Hall effect device 109-*u*. As illustrated in the figure, output voltage wave 141 of the Hall effect device 109-*u* contains a DC voltage superposed on it, since the permanent magnet 101 is magnetized into a single magnetic pole. The commutation signal 143 is obtained by comparing the output voltage wave 141 with a reference voltage 142 by a comparator.

Since the temperature characteristic of a Hall effect device is not good in general, when the ambient temperature changes, the output voltage wave 141 of the Hall effect device 109-*u* changes into, for example, an output voltage wave 144 shown in the graph. As the result, the commutation signal 143 that is an output of the comparator also changes into, for example, a commutation signal 145 shown also in the graph. Thus, the duty factor of a commutation signal changes with temperature, which deteriorates the accuracy of the commutation.

To compensate for such temperature change effects, second Hall effect devices 109-*u*', 109-*v*', 109-*w*' are placed with 180° phase difference in electrical angle each relative to the respective first Hall effect devices 109-*u*, 109-*v*, 109-*w*. By comparing each of the output voltages of the first Hall effect devices 109-*u*, 109-*v*, 109-*w* with the corresponding output voltages of the second Hall effect devices 109-*u*', 109-*v*', 109-*w*', it is possible to remove unnecessary voltages superposed on the output voltage waves.

In this case, the output voltage VHu of the first Hall effect devices 109-*u* is, $$VHu = VU + Vu \cdot \sin\theta \qquad (1)$$

where, VU is a superposed DC voltage, Vu is a signal voltage caused by the magnetic flux change, and θ is an electrical angle.

Similarly, the output voltage VHu' of the first Hall effect devices 109-$u'$ is, $$VHu' = VU' - Vu' \cdot \sin\theta \quad (2)$$

where, VU' is a superposed DC voltage, Vu' is a signal voltage caused by the magnetic flux change, and θ is an electrical angle.

The difference VHu" between the output voltage VHu of the first Hall effect devices 109-$u$ and the output voltage VHu' of the first Hall effect devices 109-$u'$ is, $$VHu'' = (VU - VU') + (Vu + Vu')\sin\theta$$

If the superposed DC voltages are adjusted so as to be VU=VU', then, $$VHu'' = (Vu + Vu')\sin\theta$$

Thus a signal voltage that is approximately twice as large as the signal voltage caused by the magnetic flux change is obtained. Further, since the difference between two voltages is obtained, noises on the signal waves can be canceled and a sinusoidal wave output little affected by disturbances can be easily obtained.

Figure 5:
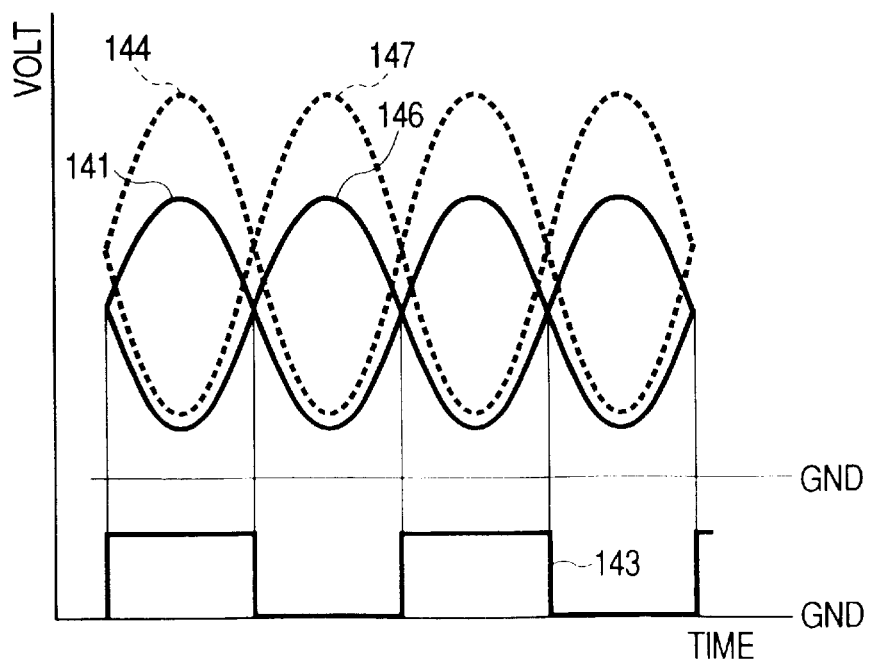
FIG. 5 is a graph illustrating a method for obtaining a commutation signal of U-phase from points of intersection of output voltage waves of Hall effect devices.

FIG. 5 is a graph illustrating a method for obtaining a commutation signal 143 of U-phase from points of intersection of output voltage wave 146 of the Hall effect device 109-$u'$ and output voltage wave 141 of the Hall effect device 109-$u$. In this case, each of the output voltage wave 146 and the output voltage wave 141 may change with temperature into an output voltage wave 144 and an output voltage wave 147, for examples, respectively. However, an instant at which these voltage waves intersect never changes. Accordingly, the duty factor of the commutation signal 143 also remains unchanged.

Figure 6:
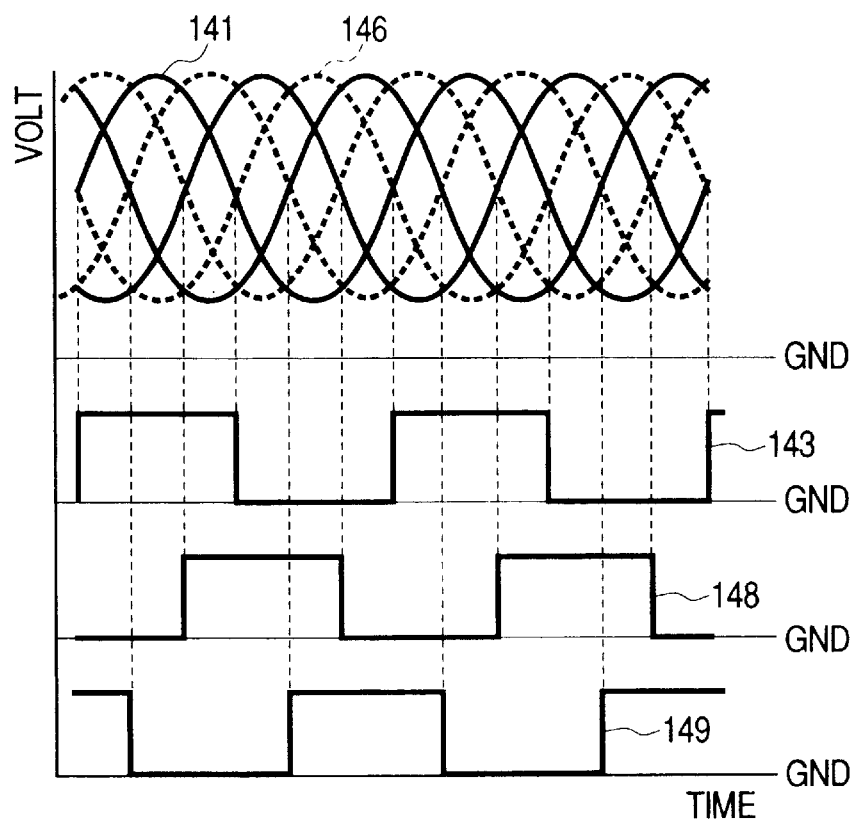
FIG. 6 is a graph illustrating commutation signals for three phases.

FIG. 6 is a graph illustrating commutation signals for three phases. As illustrated in the figure, a commutation signal 148 for V-phase and a commutation signal 149 for W-phase, with a phase difference of 120° in electrical angle between them, are generated.

Figure 7:
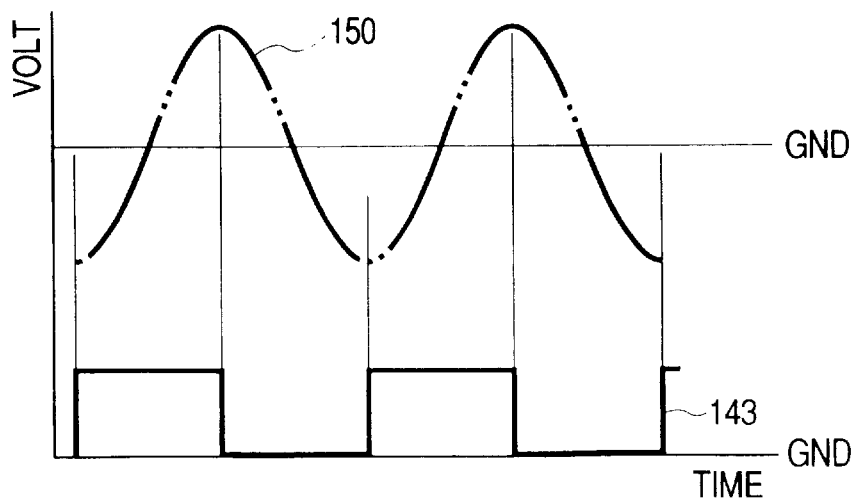
FIG. 7 is a graph illustrating a phase difference between an induced voltage wave generated by a rotation of a motor and a commutation signal.

The motor and the magnetic pole position detector shown in FIG. 1 are assembled so as to make each of the toothlike protrusions on the circumference of the first motor rotor core 112 and each of the first toothlike protrusions on the circumference of the detection rotor coincide in the axial direction. Similarly, each of the toothlike protrusions on the inner surface of the motor stator core 116 and each of the second toothlike protrusions on the inner side of the first stator teeth 106 are made to coincide with each other in the axial direction. Further, each of the main magnetic poles of the motor stator core having respective windings of U, V, W-phases and each of the positions of the Hall effect devices 109-$u$, 109-$v$, 109-$w$ are made to coincide with each other in the axial direction, respectively. FIG. 7 is a graph illustrating a phase difference between an induced voltage wave generated by rotation of the motor and the commutation signal. As shown in the figure, a commutation signal output 143 of U-phase is obtained with a phase difference of 90° in electrical angle relative to a motor induced voltage wave 150 of U-phase. Accordingly, it is possible to feed electricity to the motor windings at an optimum point through a phase shift processor in a motor drive circuit.

Figure 8:
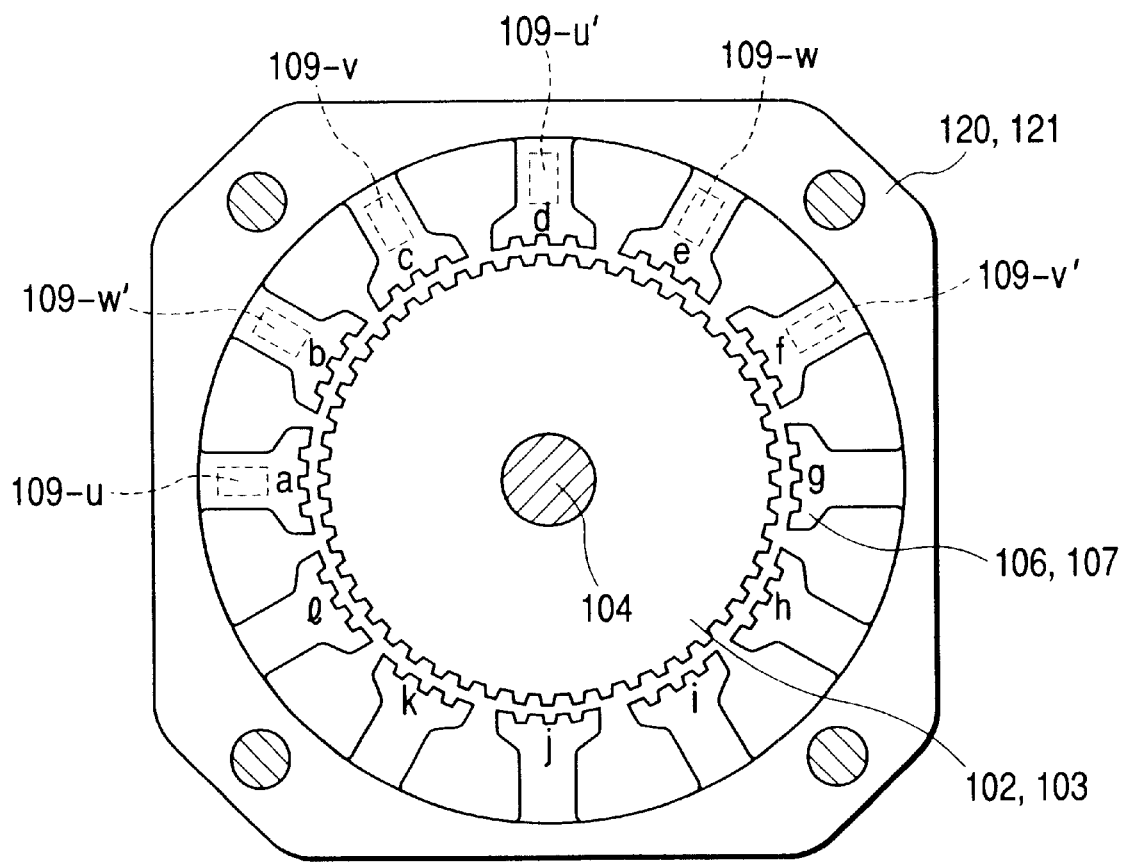
FIG. 8 is a top view of a detection stator of a preferred embodiment of the magnetic pole position detector for an electric motor according to the present invention in which an annular yoke portion of a detection stator is composed of a non-magnetic material.

FIG. 8 is a top view of a detection stator of a preferred embodiment of the magnetic pole position detector for an electric motor according to the present invention in which the first annular yoke portion 120 and the second annular yoke portion 121 of the detection stator are composed of a non-magnetic material. The first annular yoke portion 120 and the second annular yoke portion 121 thus composed of the non-magnetic material prevent the formation of magnetic circuits between the stator teeth. As the result, whole magnetic flux flowing through the first stator teeth 106 and the second stator teeth 107 can be directed to the magnetic flux concentration tips 108 and the Hall effect devices 109. Accordingly, signal-to-noise ratio in the output voltage waves of the Hall effect devices 109 composed of the alternating voltage component and the DC voltage component superposed on the former can be improved.

Figure 9:
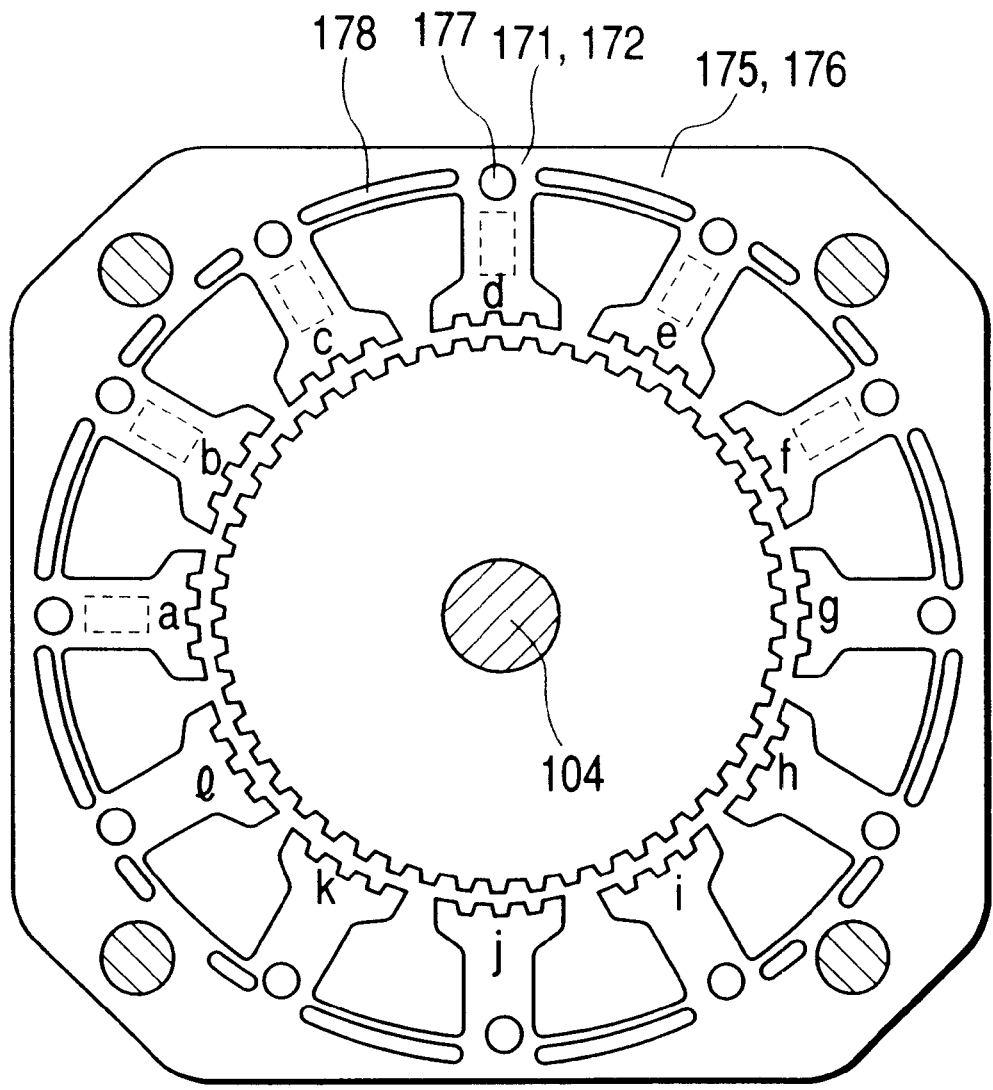
FIG. 9 is a top view of a detection stator of another preferred embodiment of the magnetic pole position detector for an electric motor according to the present invention in which openings are formed at each of the base portions of the stator teeth and each of the places between adjacent base portions in the annular yoke portion.

FIG. 9 is a top view of a detection stator of another preferred embodiment of the magnetic pole position detector for an electric motor according to the present invention. As shown in the figure, in order to avoid the complicated structure of the detection stators in which the first annular yoke portion 120 and the second annular yoke portion 121 are composed of the non-magnetic material, open holes 177, 178 are formed in the first annular yoke portion 120 and the second annular yoke portion 121, at the roots 171, 172 of the first stator teeth 106 and the second stator teeth 107 and at the places 175, 176 between the adjacent roots 171, 172 of the first stator teeth 106 and the second stator teeth 107. These openings limit the leakage of the magnetic flux from the stator teeth into the annular yoke portions as well as the magnetic flux flow between the adjacent stator teeth. As the result, signal-to-noise ratio in the output voltage waves of the Hall effect devices 109 can also be improved as in the embodiment shown in FIG. 8.

Figure 10:
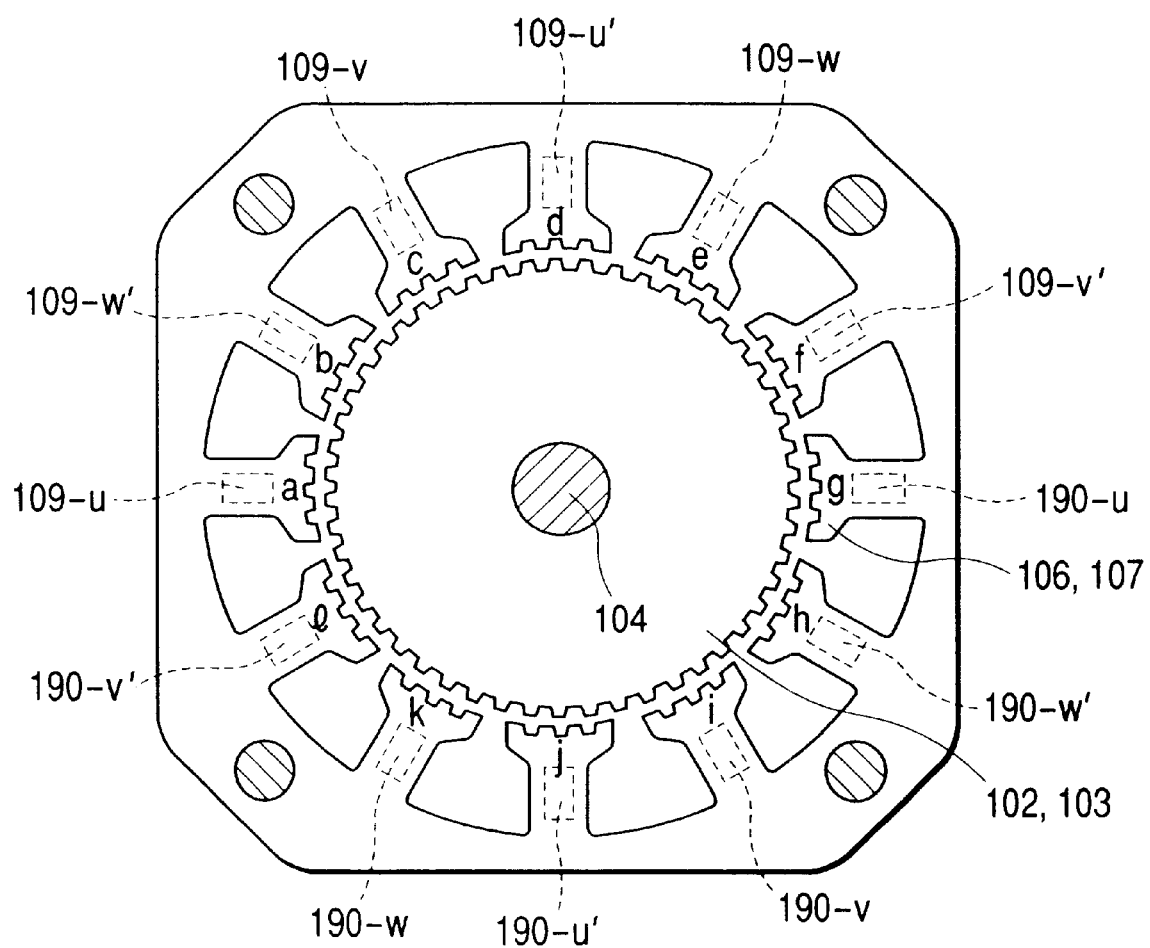
FIG. 10 is a top view of a detection rotor of a preferred embodiment of the magnetic pole position detector for an electric motor according to the present invention in which the effects on commutation signals of an eccentricity of the permanent magnet of the detection rotor are canceled.

FIG. 10 is a top view of a detection rotor of a preferred embodiment of the magnetic pole position detector for an electric motor according to the present invention in which the effects on commutation signals of an eccentricity of the permanent magnet 101 fixed between the first disc-like rotor 102 and the second disc-like rotor 103 are canceled. It sometimes occurs that the permanent magnet 101 is installed with an eccentricity to the first disc-like rotor 102 and the second disc-like rotor 103 of the detection rotor in assembling the magnetic pole position detector as shown in FIG. 1. In order to compensate the effect of the eccentricity, each of another Hall effect devices 190 are placed at the place 360° in electrical angle and 180° in mechanical angle from the respective Hall effect devices 109.

In case that the permanent magnet 101 is installed with a certain amount of eccentricity to the first disc-like rotor 102 and the second disc-like rotor 103 of the detection rotor, an output voltage wave of each of the Hall effect devices 109 caused by the eccentricity varies with one cycle in one rotation of the detection rotor. On the other hand, an output voltage wave of each of the Hall effect devices 190 caused by the eccentricity varies with 180° phase difference relative to that of the corresponding one of Hall effect devices 109. However, an output voltage wave of each of the Hall effect devices 190 caused by the magnetic reluctance variation in the radial gap, based on which the commutation signal is obtained, is in the same phase with that of the corresponding one of the Hall effect devices 109, since each of the Hall effect devices 190 is placed at the place 360° in electrical angle and 180° in mechanical angle from the corresponding one of the Hall effect devices 109. Accordingly, the effects on the commutation signals of the eccentricity of the permanent magnet 101 of the detection rotor can be lowered largely by averaging the each of the output voltage waves of the Hall effect devices 109 and the corresponding one of the output voltage waves of the Hall effect devices 190 for each of the respective phases.

The characteristics of the first embodiment of the magnetic pole position detector for an electric motor according to the present invention as explained above are as follows;

(a) Pole positions of polyphase hybrid step motor can be detected with Hall effect devices at a low cost.

(b) The principal parts of the magnetic pole position detector are equivalent to those of the hybrid step motors and can be obtained at a low cost.

(c) Since the magnetic flux concentration tip is placed on each of the stator teeth, magnetic flux loop between the adjacent stator teeth is limited, the magnetic flux is concentrated to the Hall effect device, and a commutation signal with high accuracy can be obtained.

(d) Commutation signals of higher accuracy compensated for the temperature change effects can be obtained by placing each of additional Hall effect devices with 180° phase difference in electrical angle relative to the respective Hall effect devices of respective phases of the motor and by detecting points of intersection of output voltage waves of the corresponding Hall effect devices.

(e) Commutation signals of further higher accuracy can be obtained by placing each of another additional Hall effect devices at the place 360° in electrical angle and 180° in mechanical angle from the respective Hall effect devices and by averaging each of the output voltage waves of the Hall effect devices and the each of the corresponding output voltage waves of the additional Hall effect devices.

(f) Since the principal parts of the magnetic pole position detector are equivalent to those of the hybrid step motors, the positioning of them in assembling can be made easily and no additional positioning with motor induced voltage is required.

(g) Since all electric devices including the Hall effect devices can be mounted on the printed circuit board, it is easy to make electric connections.

[Second Embodiment]

This embodiment concerns a regulator circuit for regulating the amplitudes of the output voltage waves which is used when the amplitudes of the output voltage waves of the two magneto electro transducers placed with an electrical angle of 180° apart are compared to eliminate the influence of the ambient temperature change, explained above in the first embodiment of the present invention.

Figure 11:
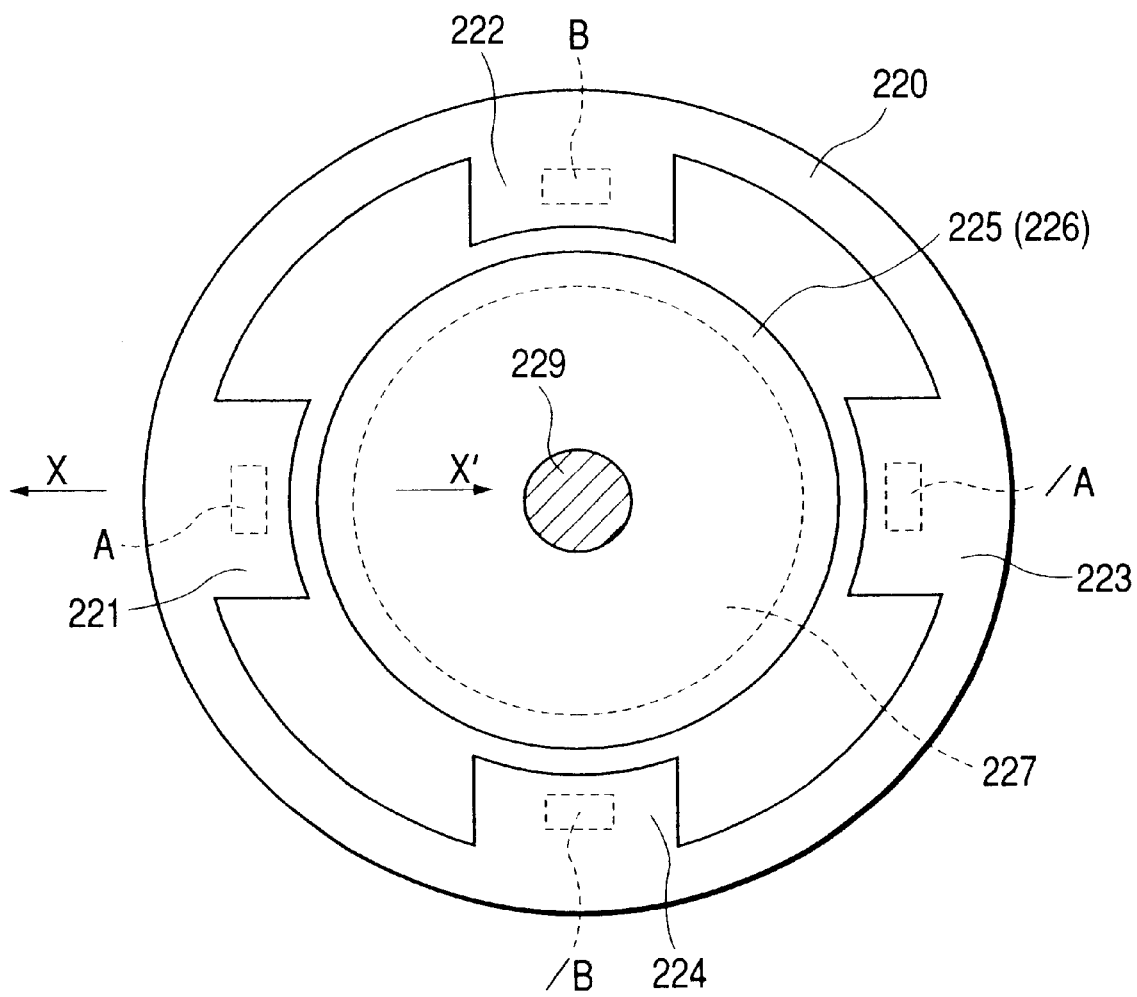
FIG. 11 is a top view of a detection rotor of a preferred embodiment of the magnetic pole position detector for an electric motor according to the present invention in which the magnetic pole position detector is used for detecting magnetic pole positions of a two-phase motor.

FIG. 11 is a top view of a detection rotor of the present embodiment of the magnetic pole position detector for an electric motor in which the magnetic pole position detector is used to detect magnetic pole positions of a two-phase motor.

A detection rotor comprised of a first disc-like rotor 225 and a second disc-like rotor 226 each having a plurality of first toothlike protrusions (not shown in the figure) and having a permanent magnet 227 between them is fixed to an axis of rotation 229 of the motor.

A detection stator is placed surrounding the detection rotor with a gap in radial direction between them. The detection stator comprises a first stator core and a second stator core. The first stator core comprises an annular portion 220-1 and four stator teeth 221-1, 222-1, 223-1, 224-1 arranged in the inner side of the annular yoke portion 220-1 with an interval of 90° between them. The first stator core comprises an annular portion 220-2 and four stator teeth 221-2, 222-2, 223-2, 224-2 arranged in the inner side of the annular yoke portion 220-2 with an interval of 90° between them. At each of the inner ends of the stator teeth 221-1, 222-1, 223-1, 224-1, 221-2, 222-2, 223-2, 224-2, second toothlike protrusions (not shown in the figure) are formed. A magneto electro transducer A is installed between the first stator tooth 221-1 and the second stator tooth 221-2. A magneto electro transducer B is installed between the first stator tooth 222-1 and the second stator tooth 222-2. A magneto electro transducer /A is installed between the first stator tooth 223-1 and the second stator tooth 223-2. A magneto electro transducer /B is installed between the first stator tooth 224-1 and the second stator tooth 224-2.

Figures 1, 12:
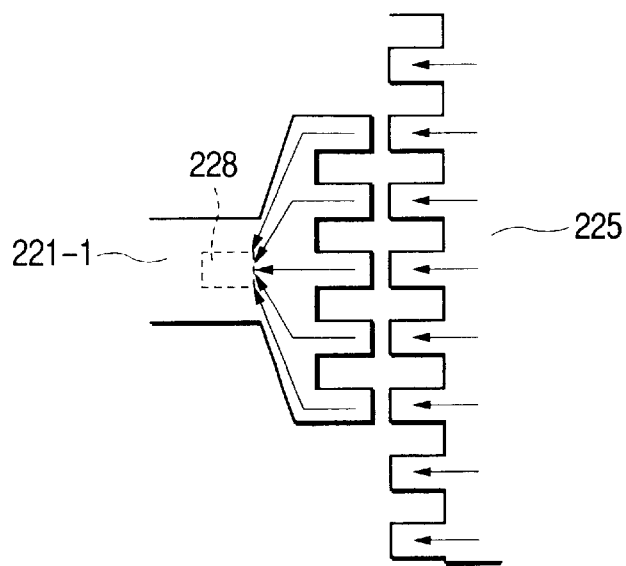
Figures 2, 12:
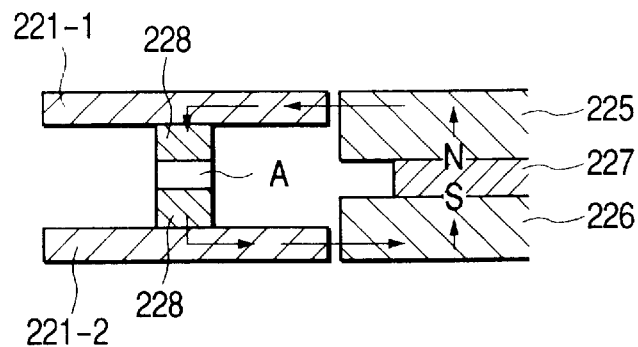
Figures 3, 12:
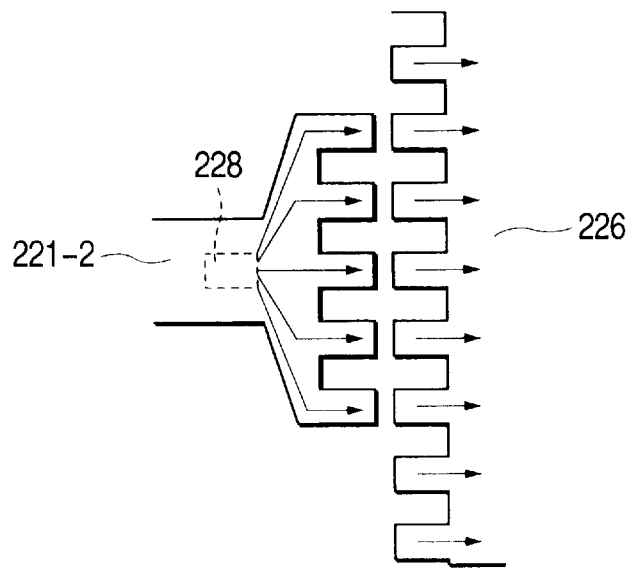

FIGS. 12-1 to 12-3 are schematic illustrations showing flows of magnetic flux loop in the direction of X–X' line in FIG. 11. In these figures, FIG. 12-1 is a top view, FIG. 12-2 is a vertical sectional view, and FIG. 12-3 is a bottom view. As indicated by arrows, a magnetic flux generated from N-pole of the permanent magnet 227 flows through the first toothlike protrusions formed on the circumference of the first disc-like rotor 225 of the detection rotor, the gap in the radial direction, the second toothlike protrusions formed on the inner end of the first stator tooth 221-1, the Hall effect device A held between a pair of magnetic flux concentration tips 228, the second stator tooth 221-2, the gap in the radial direction and the first toothlike protrusions of the second disc-like rotor 226 of the detection rotor, then returns to the S-pole of the permanent magnet 227.

FIGS. 12-1 to 12-3 show an occasion when the magnetic reluctance between the detection rotor and the stator teeth is at minimum. As the detection rotor rotates, the magnetic reluctance varies since the relative position between the first teeth like protrusions of the detection rotor and the second teeth like protrusions of the detection stator varies. As the result, magnetic field intensity applied to the Hall effect device 228 varies and the output wave of the Hall effect device 228 also varies sinusoidaly.

Figure 13:
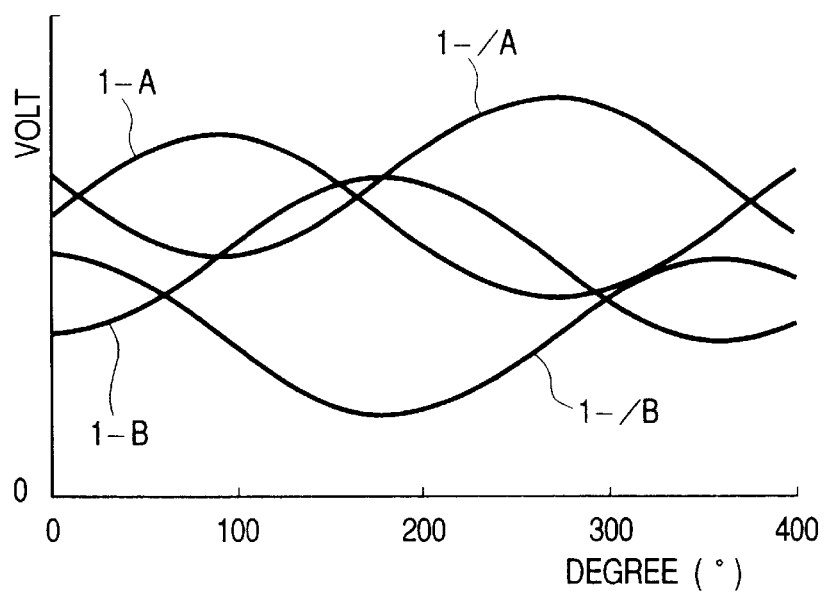
FIG. 13 is a graph illustrating output voltage waves transmitted from magneto electro transducers.

FIG. 13 is a graph illustrating output voltage waves transmitted from magneto electro transducers. In the figure, 1-A is an A-phase output voltage wave of the magneto electro transducer A, 1-B is a B-phase output voltage wave of the magneto electro transducer B, 1-/A is a /A-phase output voltage wave of the magneto electro transducer /A, 1-/B is a /B-phase output voltage wave of the magneto electro transducer /B. There is a phase difference of an electrical angle of 90° between A-phase output voltage wave and B-phase output voltage wave. On the other hand, there is a phase difference of an electrical angle of 180° between A-phase output voltage wave and /A-phase output voltage wave, and between B-phase output voltage wave and /B-phase output voltage wave. In the following description, explanation is made for the case where Hall effect devices are used as magneto electro transducer.

Magnetic flux applied to the Hall effect device includes an alternating component and a direct component superposed on the former. The alternating component of magnetic flux is the modulated magnetic flux of the magnetic flux generated from a magnetic pole of permanent magnet 227 by the variation of the relative position between the first teeth like protrusions of the detection rotor and the second teeth like protrusions of the detection stator. Accordingly, direct voltage components are also superposed on the output voltage waves of the Hall effect devices. Further, each of the Hall effect devices has individual dispersion in the magnetic sensitivity and offset voltage. Accordingly, the amplitudes of output voltage waves of the Hall effect devices of different phases differ, as shown in FIG. 13. Therefore, it is necessary to adjust the amplitudes of output voltage waves of the Hall effect devices into a same value in order to obtain commutation signals with high accuracy from the output voltage waves of the Hall effect devices.

Figure 14:
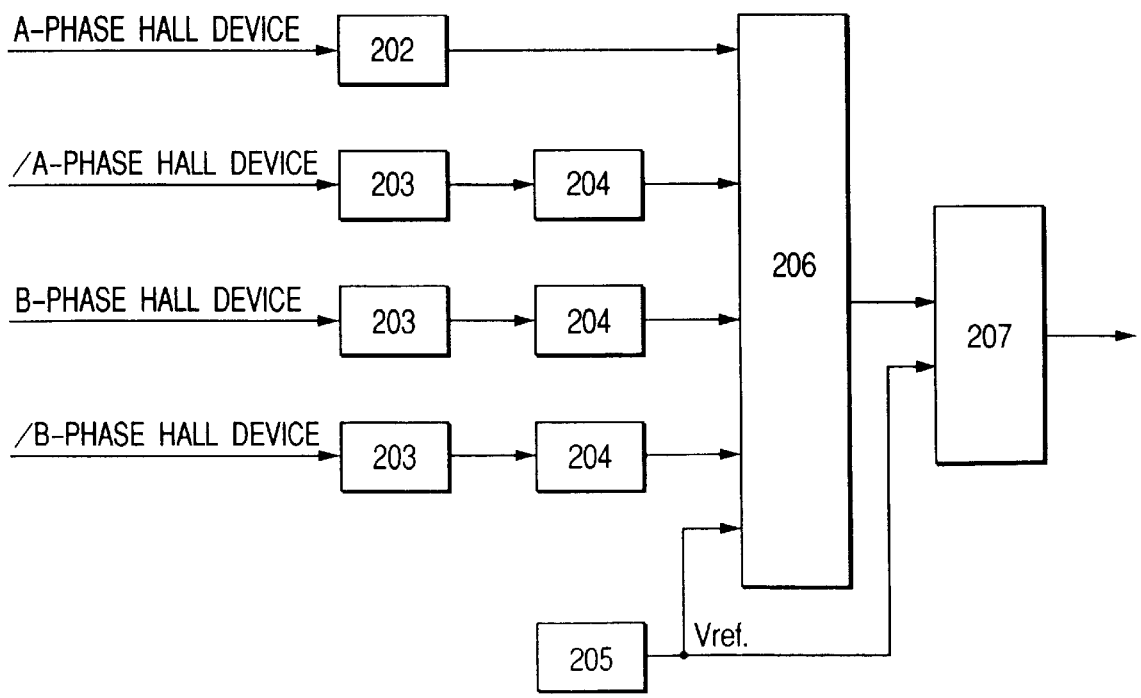
FIG. 14 is a block diagram of a regulator circuit for adjusting amplitudes of output voltage waves transmitted from Hall effect devices.

FIG. 14 is a block diagram of a regulator circuit for adjusting the amplitudes of the output voltage waves transmitted from the Hall effect devices. The regulator circuit shown in the figure comprises a first amplifier 202, second amplifiers 203 of which number is less by one than that of the Hall effect devices, semi-conductor variable resistors 204 of which number is also less by one than that of the Hall effect devices, a reference voltage generator 205, a differential amplifier 206 and a comparator 207. In the regulator circuit as shown in FIG. 14, an output of an arbitrarily chosen Hall effect device as a reference Hall effect device (in the example shown in the figure, A-phase Hall effect device) is inputted to the first amplifier 202, and an output of the first amplifier 202 is inputted into the differential amplifier 206. Each of the outputs of the Hall effect devices not chosen as the reference Hall effect device (in the example shown in the figure, /A-phase Hall effect device, B-phase Hall effect device and /B-phase Hall effect device) is inputted into the corresponding one of the second amplifiers 203, each of the outputs of the second amplifiers 203 is inputted into the corresponding one of the semi-conductor variable resistors 204, each of the outputs of the semi-conductor variable resistors 204 is inputted into the differential amplifier 206. Further, a reference voltage Vref. which is an output of the reference voltage generator 205 is inputted into the differential amplifier 206 and the comparator 207. In the comparator 207, the output of the differential amplifier 206 is compared with the reference voltage Vref. to obtain the output pulses.

In the regulator circuit as shown in FIG. 14, each of the amplitudes of the output voltage waves of the Hall effect devices of respective phases is regulated as follows.

At first, the amplitude of the output voltage wave of the reference Hall effect device (in the example shown in the figure, A-phase Hall effect device) is amplified into a predetermined value by the first amplifier 202.

Figure 15:
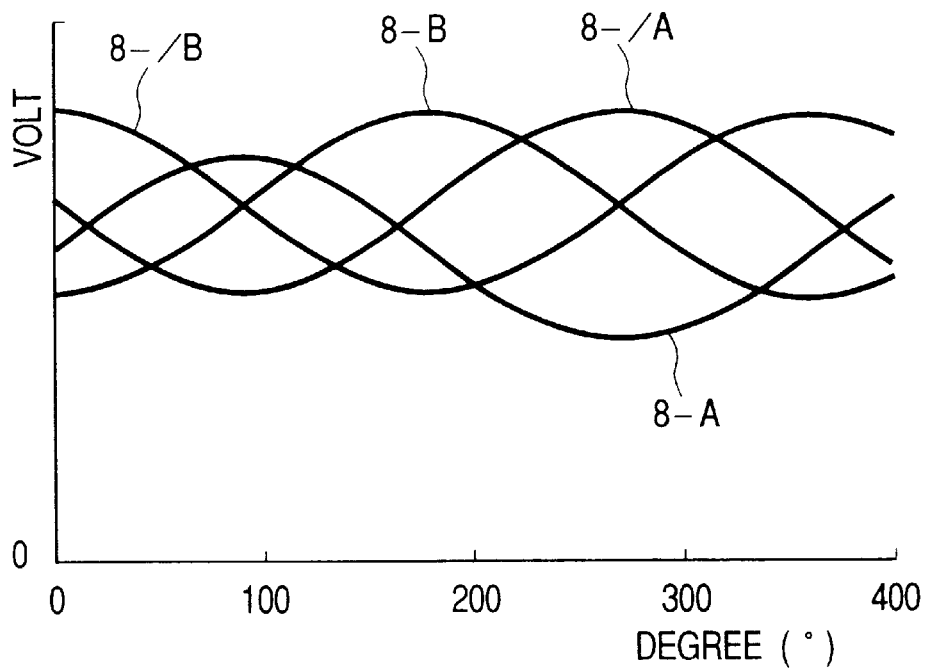
FIG. 15 is a graph illustrating amplified output voltage waves.

Then, each of the amplitudes of the output voltage waves of the Hall effect devices other than the reference Hall effect device (in the example shown in the figure, /A-phase Hall effect device, B-phase Hall effect device and /B-phase Hall effect devices) is amplified to a value a little bit larger than that of A-phase Hall effect device by respective second amplifiers 203. FIG. 15 is a graph showing thus amplified output voltage waves, in which 8-A is an amplified A-phase output voltage wave, 8-B is an amplified B-phase output voltage wave, 8-/A is an amplified /A-phase output voltage wave and 8-/B is an amplified /B-phase output voltage wave.

Then, each of the voltage amplitudes of the amplified B-phase output voltage wave, the amplified /A-phase output voltage wave and the amplified /B-phase output voltage wave is divided by dividers to make each of them equal to the amplitude of the amplified A-phase output voltage wave that is the reference amplitude. Each of resistance values of the semi-conductor variable resistors 204 used in the divider at this stage is stored in nonvolatile memories in the respective semi-conductor variable resistors 204.

Figure 16:
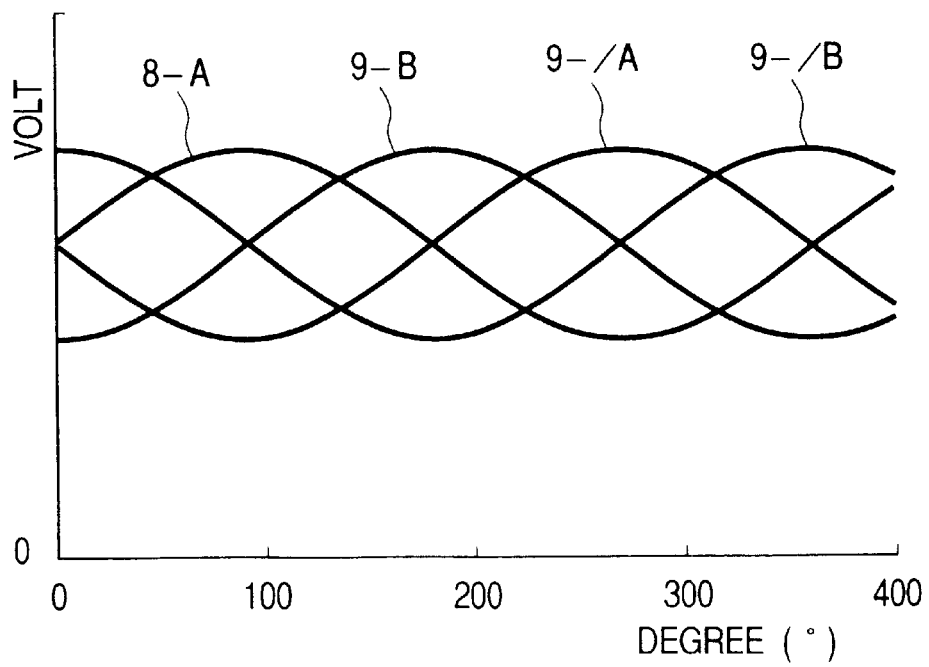
FIG. 16 is a graph illustrating each of the output voltage waves of respective phases of which amplitudes are adjusted to an amplitude of an amplified output voltage wave of A-phase.

FIG. 16 is a graph illustrating each of the output voltage waves of respective phases of which amplitudes are thus adjusted equal to the amplitude of the amplified A-phase output voltage wave, in which 9-B is the adjusted B-phase output voltage wave, 9-/A is the adjusted /A-phase output voltage wave, 9-/B is the adjusted /B-phase output voltage wave.

The amplified A-phase output voltage wave A-8, each of the adjusted output voltage waves 9-B, 9-/A, 9-/B and the reference voltage are inputted into the differential amplifier 206 to obtain a differential output voltage wave 10-AB of the output voltage wave 8-A and the output voltage wave 9-B, a differential output voltage wave 10-A/A of the output voltage wave 8-A and the output voltage wave 9-/A, a differential output voltage wave 10-A/B of the output voltage wave 8-A and the output voltage wave 9-/B, and a differential output voltage wave 10-B/B of the output voltage wave 9-B and the output voltage wave 9-/B.

Figure 17:
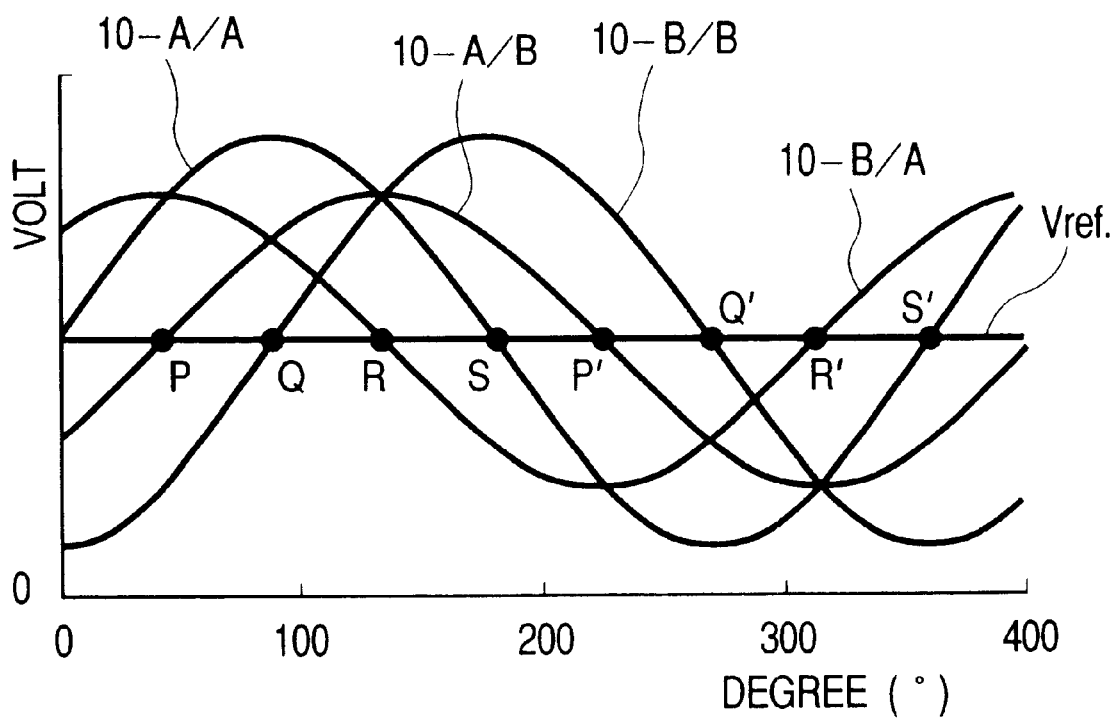
FIG. 17 is a graph illustrating output voltage waves transmitted from a differential amplifier.

FIG. 17 is a graph illustrating output differential voltage waves 10-AB, 10-A/A, 10-A/B, 10-B/B. As shown in the figure, differential output voltage waves are centered on the reference voltage Vref.

Then, the differential output voltage waves 10-AB, 10-A/A, 10-A/B, 10-B/B and the reference voltage Vref. are inputted into the comparator 207, and points of intersection at which two of the differential output voltage waves 10-AB, 10-A/A, 10-A/B, 10-B/B cross are detected by the comparator 207.

Figure 18:
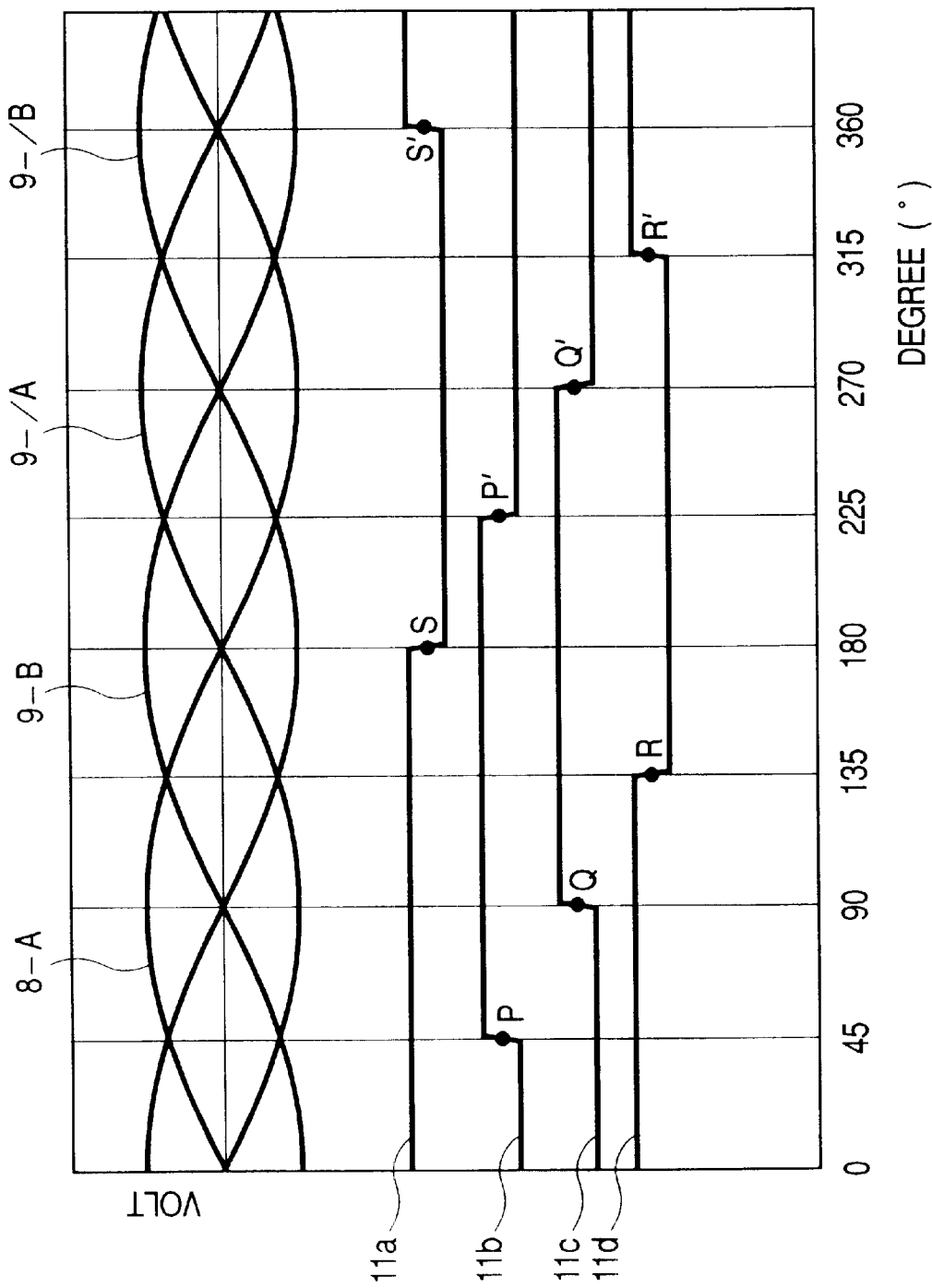
FIG. 18 is a graph illustrating points of intersection at which the differential output voltage waves and the reference voltage Vref. cross.

FIG. 18 is a graph illustrating the points of intersection at which the differential output voltage waves 10-AB, 10-A/A, 10-A/B, 10-B/B and the reference voltage Vref. cross.

As shown in the figure, A-phase output voltage wave 8-A which is the reference wave and the output voltage wave 9-/A having a phase difference of an angle of 180° relative to the output voltage wave 8-A cross at the point of intersection S and S', by which a pulse signal 11a is obtained.

B-phase output voltage wave 9-B and the output voltage wave 9-/B having a phase difference of an angle of 180° relative to the output voltage wave 9-B cross at the point of intersection Q and Q', by which a pulse signal 11c is obtained.

A-phase output voltage wave 8-A and the output voltage wave 9-/B having a phase difference of an angle of 90° relative to the output voltage wave 8-A cross at the point of intersection P and P', by which a pulse signal 11b is obtained.

A-phase output voltage wave 8-A and the output voltage wave 9-B having a phase difference of an angle of 90° relative to the output voltage wave 8-A cross at the point of intersection R and R', by which a pulse signal 11d is obtained.

As can be seen in the figure, each of the rising edge and the falling edge of respective pulse signals 11a to 11d corresponds to the point of intersection of two waves in the amplified A-phase output voltage wave 8-A, the adjusted B-phase output voltage wave 9-B, the adjusted /A-phase output voltage wave 9-/A and the adjusted /B-phase output voltage wave 9-/B. Therefore, pulse signals 11a to 11d represent the respective magnetic pole positions of the detection rotor and are the output pulses for the magnetic pole position detector for the electric motor.

When each of the amplitudes of the output voltage waves of the respective phase is equal to the amplitude of the output voltage wave of the reference phase, the duty ratio of each of the output pulse signals 11a to 11d is 50%. So, each of the resistances of the semi-conductor variable resistors 204 is set so as to make the duty factor of each output pulse signal 50%.

The resistances of semi-conductor variable resistors 204 are controlled by input pulses. Accordingly, it is possible to make the process of adjusting the amplitudes of the output voltage waves of the respective phase to be equal to the amplitude of the output voltage wave of the reference phase automatic, by providing an automatic controller for controlling the input pulses to be inputted into the semi-conductor variable resistors 204.

Figure 19:
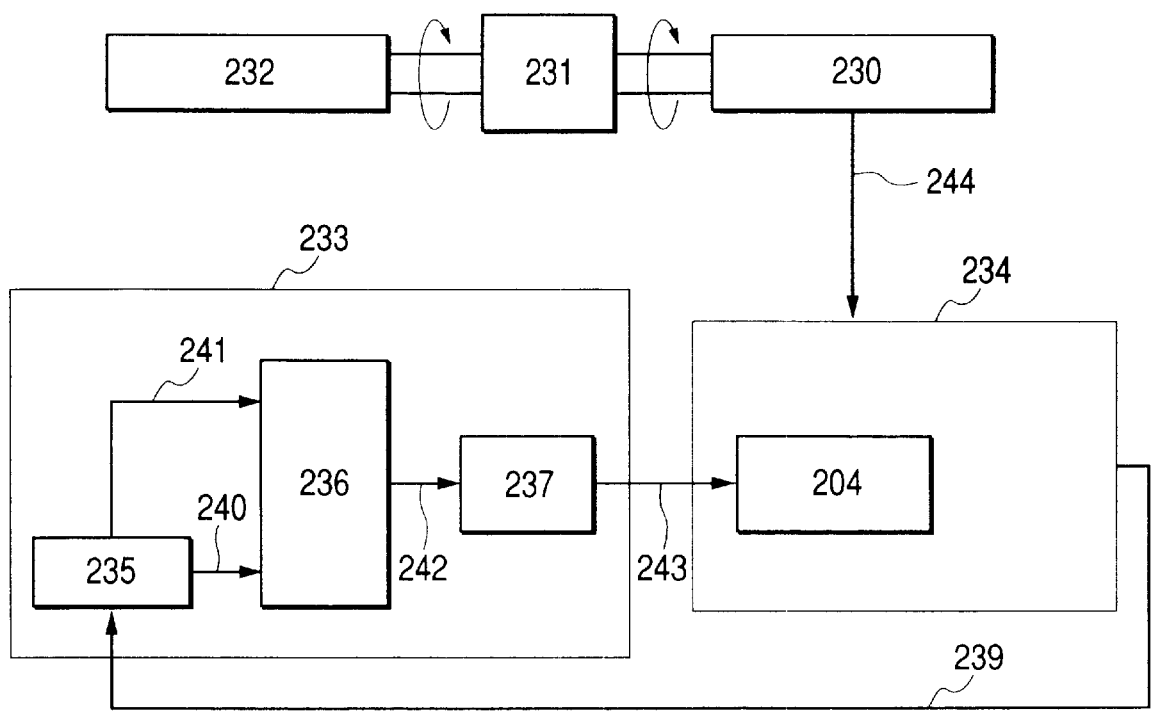
FIG. 19 is a block diagram of a system for automatically controlling the semi-conductor variable resistors in the regulator circuit shown in FIG. 14.

FIG. 19 is a block diagram of a system for automatically controlling the semi-conductor variable resistors in the regulator circuit shown in FIG. 14. In the figure, 230 is the magnetic pole position detector, 232 is an external rotary machine for driving the detection rotor of the magnetic pole position detector 230 at a constant rotational speed, 231 is a coupling for connecting an axis of the external rotary machine 230 with the axis of rotation of the magnetic pole position detector 230, 233 is the automatic controller for automatically controlling the semi-conductor variable resistors in the regulator circuit, 234 is the regulator circuit of the magnetic pole position detector, 235 is a timer, 236 is a comparator, 237 is a pulse generator for controlling semi-conductor variable resistor, 204 is the semi-conductor variable resistors, 239 is a signal lead wire for connecting the regulator circuit 234 with the automatic controller 233, 240 is a first signal lead wire for connecting timer 235 with the comparator 236, 241 is a second signal lead wire for connecting the timer 235 with the comparator 236, 242 is a signal lead wire for connecting the comparator 236 with the pulse generator 237, and 243 is a signal lead wire for connecting the pulse generator 237 with the semi-conductor variable resistors 204. The regulator circuit 234 in FIG. 19 is similar to the regulator circuit shown in FIG. 14. Signals transmitted from the regulator circuit 234 through the signal lead wire 239 are output signals of the comparator 207 in FIG. 14.

The semi-conductor variable resistors are controlled as follows.

At first, a gain of the first amplifier 202 shown in FIG. 14 is controlled so as to make the output voltage a predetermined value. Then, gains of the second amplifiers 203 are controlled so as to make the output voltages greater than the output voltage of the amplifier 202.

Then, the magnetic pole position detector 230 is driven at a certain constant rotational speed by the external rotary machine 232. Output voltage waves of the amplifiers 203 shown in FIG. 14 will become those as shown in FIG. 15 for example. At this point of time, signal waves with different amplitudes as shown in FIG. 15 are transmitted into the differential amplifier 206, since the resistance values of the semi-conductor variable resistors 204 have not been controlled yet, and output signal waves of the comparator 207 of the regulator circuit 234 are not properly arranged as those shown in FIG. 18. The output pulse signals 11$a$, 11$b$, 11$d$ of the comparator 207 are transmitted to a counter 235 through the signal lead wire 239. The counter 235 measures each of the periods of the output pulse signals 11$a$, 11$b$, 11$d$ and each of the time within which the respective output pulse signals 11$a$, 11$b$, 11$d$ are at high level.

For example, an output pulse signal 11$d$ of the comparator 207 is transmitted to the counter 235, and the counter 235 measures a half of the period (time) of the pulse wave. The half of the period is inputted into the comparator 236 as a target value through the second signal lead wire 241. Similarly, the counter 235 measures a time within which the output pulse signal 11$d$ is at high level and input it to the comparator 236 through the first signal lead wire 240. The comparator 236 compares the half of the period with the time within which the output pulse signal is at high level. The difference of the half of the period and the time within which the output pulse signal is at high level is inputted into the pulse generator 237 through the signal lead wire 242. The pulse generator 237 generates a pulse proportional to the time difference, and the pulse generated by the pulse generator 237 is inputted into the semi-conductor variable resistor 204 through the signal lead wire 243. The resistance value of the semi-conductor variable resistor 204 is varied in accordance with the number of the pulses. As the result, the output pulse signal 11$d$, of which the duty factor is varied, is outputted from the regulator circuit 234 and transmitted into the counter 235 again through the signal lead wire 239.

This process is repeated until the difference of the half of the period and the time within which the output pulse signal is at high level becomes a predetermined value (zero for example). The resistance value at the time when the time difference reaches the predetermined value is stored in the nonvolatile memory device (not shown in the figure) in the regulator circuit 234, and the control process of the semi-conductor variable resistors of this phase is completed.

The above explanation is made in the case where a output pulse of a phase is processed with a single automatic controller 233 and a single comparator 207, and another output pulse of another phase is successively adjusted with the identical automatic controller 233 and the identical comparator 207. Preferably, a plurality of the automatic controllers 233 (three sets in this example) disposed in parallel are used for processing a plurality of output pulses of different phases to control the resistances of all of the semi-conductor variable resistors 204 at once.

In the above embodiment, explanation is made for a case where the magnetic pole position detector for an electric motor according to the present invention is used as a magnetic pole position detector for two-phase motor, however, the magnetic pole position detector can also be used as a magnetic pole position detector for n-phase motor (n is an integer equal to or greater than 2).

The characteristics of the second embodiment of the magnetic pole position detector for an electric motor according to the present invention are as follows;

(a) Since the amplitudes of the sinusoidal output voltage waves of the magnetic pole position detector on which DC voltage components are superposed and which have certain dispersion can be adjusted to be equal to the amplitude of the voltage wave of the reference phase, the all points of intersection of the output voltage waves can be used for generating the commutation signals and the available pulse numbers to be used can be increased.

(b) Since the semi-conductor variable resistors are used as variable resistors for adjusting the amplitudes of the output voltage waves of the magnetic pole position, the resistance values of the variable resistors, and therefore the amplitudes of the output voltage waves, can be controlled automatically.

(c) Since the semi-conductor resistors relatively insusceptible to temperature change and vibrations are used as voltage dividers, the reliability of the set values of the variable resistors, and therefore the reliability of the magnetic pole position detector, can be raised.

In the second embodiment of the magnetic pole position detector for an electric motor according to the present invention as explained above in detail, the output pulses having duty factor of 50% and with high accuracy that can be used as the commutation signals can be generated from the output voltage waves, having certain dispersion, of the magneto electro transducers of the magnetic pole position detector, pulse numbers usable as the commutation signals can be increased, and further the output pulses can be adjusted automatically so as to make the duty ratio 50%.

[Third Embodiment]

Figure 20:
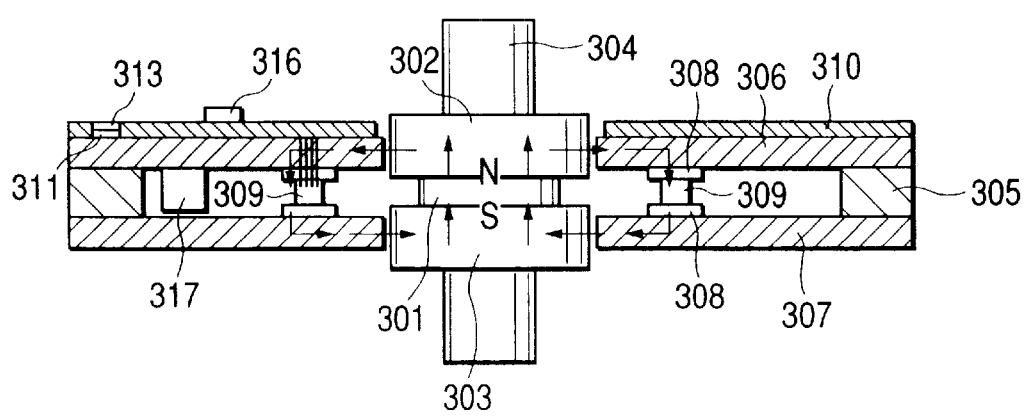
FIG. 20 is a cross-sectional view of the third embodiment of the magnetic pole position detector for an electric motor according to the present invention.

FIG. 20 is a cross-sectional view of the third embodiment of the magnetic pole position detector for an electric motor according to the present invention. Detection stator in this embodiment comprising a first stator core 306 and a second stator core 307 both made of a magnetic material. A printed circuit board 310 is attached on an outer surface of the first stator core 306 with a surface of the printed circuit board 310 on which lead foils are printed out side. A plurality of Hall effect devices 309 to be used as the magneto electro transducers are mounted on a surface of the printed circuit board 310 on which the lead foils are not printed.

Figure 21:
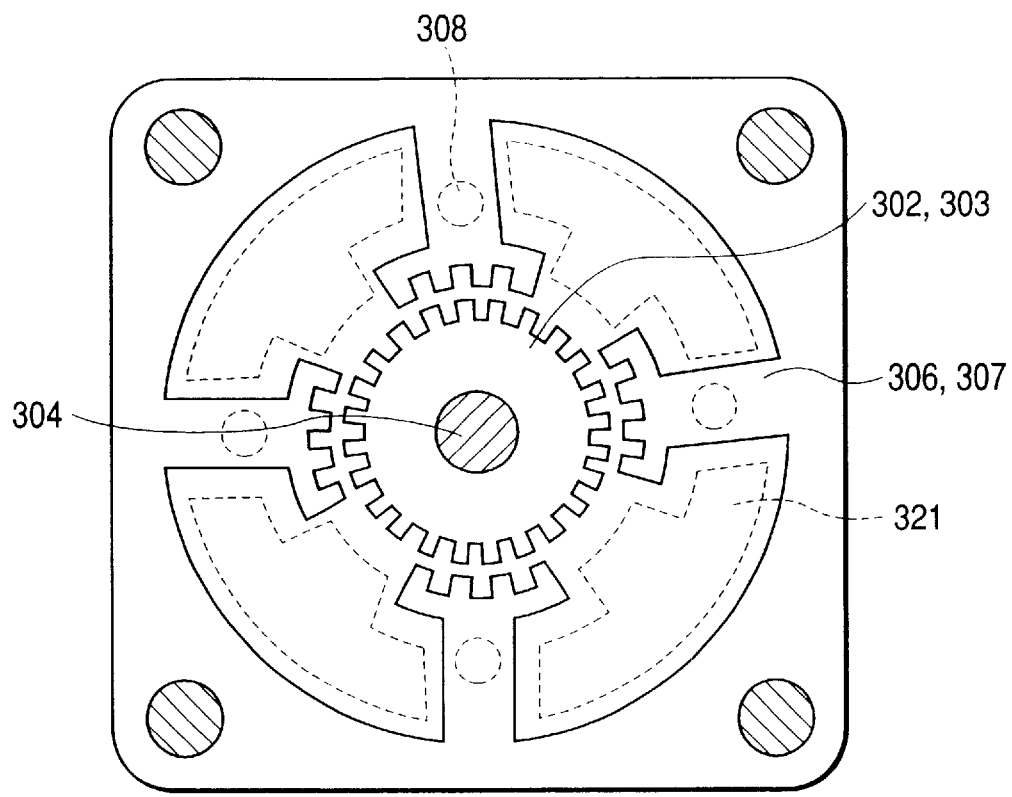
FIG. 21 is a top view of a magnetic pole position detector before installation of a printed circuit board.

FIG. 21 is a top view of the magnetic pole position detector for an electric motor before attaching the printed circuit board 310 on it. The first stator core and the second stator core are placed respectively opposing the circumferences of a first disc-like rotor 302 and a second disc-like rotor 303 with a gap in the radial direction between them. Each of the first disc-like rotor 302 and the second disc-like rotor 303 has first tooth like protrusions on the circumference and fixed to the axis of rotation of the motor. Each of the first stator core and the second stator core is comprised of an annular yoke portion and stator teeth 306, 307 formed at regular intervals on an inner side of the annular york portion. Second tooth like protrusions are formed on the inner end of each of the stator teeth 306, 307. The first stator core and the second stator core are combined with each other with a gap in the axial direction between them so as to make the respective second toothlike protrusions coincide with each other in the axial direction. A magnetic flux concentration tip 308 is formed on the inner surface of each of the stator teeth 306 of the first stator core. The magnetic flux concentration tip 308 is also formed on the inner surface of each of the stator teeth 307 of the second stator core. Each of the magnetic flux concentration tip 308 is located so as to opposing each other.

Figure 22:
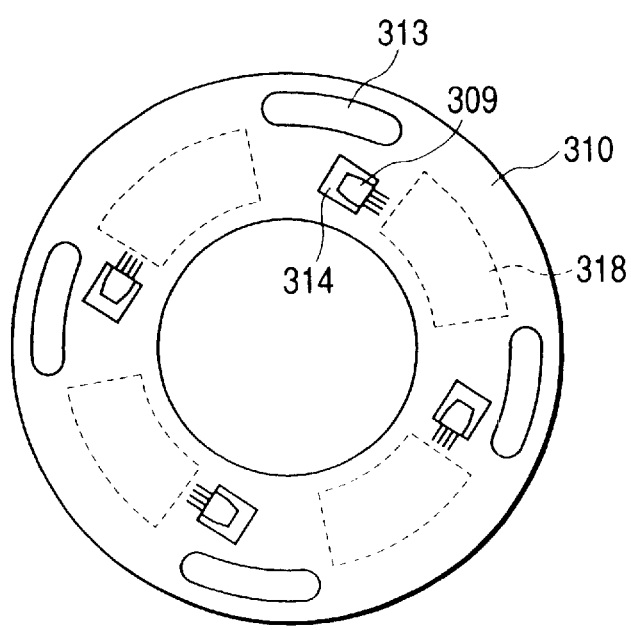
FIG. 22 is a plan view of a surface of the printed circuit board on which lead foils are not printed.

FIG. 22 is a plan view of a surface of the printed circuit board 310 on which lead foils are not printed. As shown in the figure, a plurality of Hall effect devices 309 which are magneto electro transducers are mounted on the printed circuit board 310. A plurality of guide holes 313 of circular arc form is formed at the circumference portion of the printed circuit board 310. Further, a plurality of eyeholes 314 for ascertaining the positions of the Hall effect devices 309 are also formed close to the Hall effect devices 309.

Figure 23:
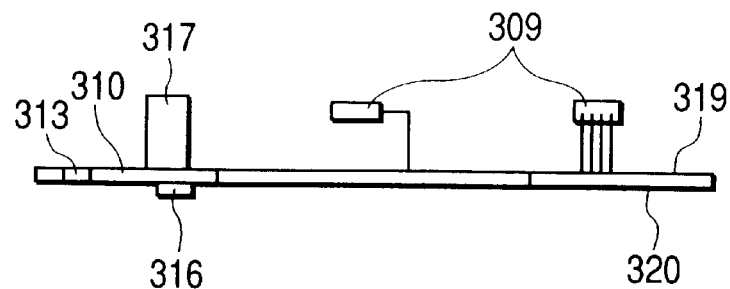
FIG. 23 is a side view of the printed circuit board on which a plurality of Hall effect devices is mounted.

FIG. 23 is a side view of the printed circuit board 319 on which a plurality of the Hall effect devices 309 is mounted. As shown in the figure, the Hall effect devices 309 are attached to the printed circuit board 310 with their lead legs bent by an angle of 90° at a proper height (corresponding approximately to the sum of the thickness of the stator tooth 306 and that of the magnetic flux concentration tip 308) from the surface of the printed circuit board 310 on which the lead foils are not printed, so as to make the magnetism sensitive plane of the Hall effect devices 309 parallel to the surface of the printed circuit board 310. Each of the Hall effect devices 309 is placed at the corresponding position at which corresponding magnetic flux concentration tip 308 is formed on the inner surface of the stator tooth 306.

Figure 24:
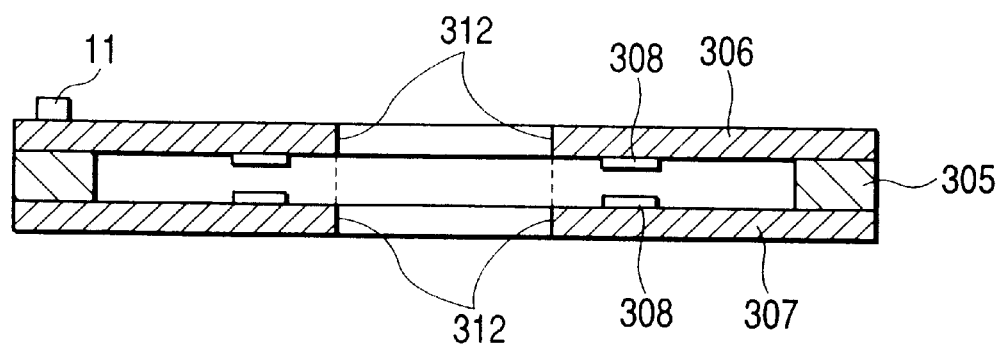
FIG. 24 is a side view of the detection stator before attaching the printed circuit board on it.

FIG. 24 is a side view of the detection stator comprising the first stator core and the second stator core, before attaching the printed circuit 310 board on it. The first stator core 306 and the second stator core 307 are combined opposing each other with a spacer 305 made of a non-magnetic material with a predetermined gap between them. A pair of the magnetic flux concentration tips 308 are formed on the inner surfaces of the stator tooth 306 and the stator tooth 307 opposing each other. The second toothlike protrusions (not shown in the figure) with a predetermined dimension are formed on the inner circular arc portions 312 of the inner ends of the stator teeth 306, 307 by machining. Since only mechanical parts are attached to the detection stator shown in FIG. 24, the second toothlike protrusions can be machined without damaging electronic parts that will be mounted later. Also, debris and the like attached to the detection stator during the machining can be removed by cleaning.

After finishing of the machining of the second toothlike protrusions of the stator teeth 306, 307, the printed circuit board 310 on which the Hall effect devices 309 and the electronic parts 316, 317 are mounted is attached to the upper surface of the first stator core 306.

The printed circuit board 310 is attached to the upper surface of the first stator core 306 as follows.

The surface of the printed circuit board 310 on which the Hall effect devices 309 and the electronic parts 316, 317 are mounted is faced toward the first stator core. Then, the printed circuit board 310 is placed on the first stator core so as to make each of the Hall effect devices 309 pass through openings 321 (see FIG. 21) between the adjacent stator teeth 306, and to make each of guides 11 formed on the first stator core inserted into the corresponding guide holes 313. Then the printed circuit board 310 is rotated along the guide holes 313 of circular arc form to make each of the Hall effect devices 309 placed between the pair of magnetic flux concentration tips 308, and then the said printed circuit board 310 is fixed on the first stator core. Additionally, the positioning of each of the Hall effect devices 309 between the corresponding pair of magnetic flux concentration tip 308 is ascertained through the eye holes 314, and the fine adjustment of the positioning is made as necessary.

As shown in FIGS. 22 and 23, those parts as the electronic parts 317 and the Hall effect device 309 with lead legs are mounted on the surface of the printed circuit board 310 on which lead foils are no printed, whereas surface mounting electronic parts 316 are mounted on the soldering surface of the printed circuit board 310 on which lead foils are printed. The place where the electronic parts 317 with lead legs are mounted is limited to areas 318 where the electronic parts 317 do not interfere with the stator teeth 306 when the printed circuit board 310 is attached on the first stator core.

In the above embodiments, explanation is made for the case in which the detection rotor with first toothlike protrusions on the circumference is used. Another detection rotor comprised of a cylindrical permanent magnet with multipole magnetization on its circumference can also be used in place of the detection rotor with first toothlike protrusions.

Figure 25:
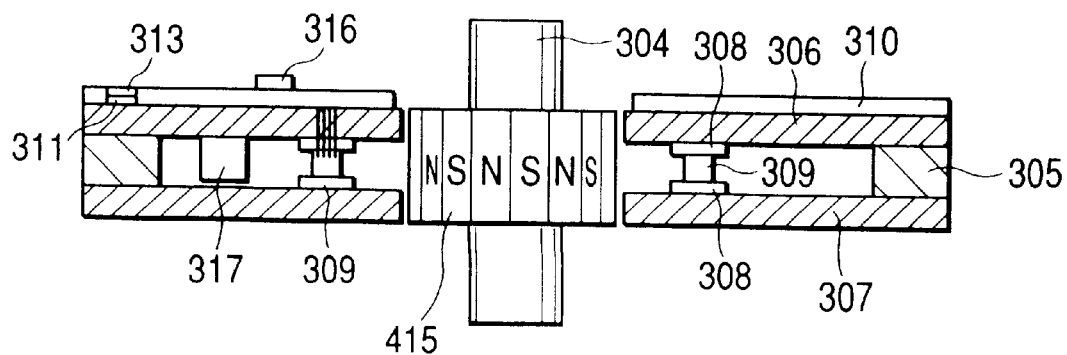
FIG. 25 is a cross-sectional view of an embodiment of the magnetic pole position detector for an electric motor according to the present invention in which a detection rotor comprises a cylindrical permanent magnet with multipole is used.

FIG. 25 is a cross-sectional view of an embodiment of the magnetic pole position detector for an electric motor according to the present invention in which a detection rotor comprised of a cylindrical permanent magnet with multipole is used. The detection rotor comprises a cylindrical permanent magnet 315 with multipole magnetization on its circumference. Pitch of the toothlike protrusions formed on the inner ends of the stator teeth of the detection stator are made so as to coincide with the pitch of the magnetization of the cylindrical permanent magnet 315. Other details are similar to those embodiments explained above, and therefore omitted.

Effects of the third embodiment of the magnetic pole position detector for an electric motor according to the present invention as explained above are as follows;

(a) Manufacturing time of the magnetic pole position detector can be shortened, since the parts composing magnetic circuit and the printed circuit board mounting electronic parts including the magneto electro transducers can be prepared in parallel.

(b) Reliability of the magnetic pole position detector can be improved, since the positioning of the magneto electro transducers can be adjusted and ascertained from above of the printed circuit board.

(c) Miniaturization and cost down of the magnetic pole position detector can be achieved, since limitations on the form of the printed circuit board, printed lead foils and mounting of electronic parts are relaxed.

(d) Output sensitivity of the magneto electro transducer can be raised, since the toothlike protrusions on the inner ends of the stator teeth can be finished by machining and the gap in the radial direction through which the toothlike protrusions of the stator teeth oppose the toothlike protrusion of the detection rotor can be minimized.

What is claimed is:

1. A magnetic pole position detector for an electric motor comprising a detection rotor, a detection stator, magnetic flux concentration tips and magneto electro transducers, said detection rotor is fixed to a rotatable shaft of said electric motor and comprised of a pair of disc-shape rotor elements having a plurality of first tooth protrusions on their circumferences and a permanent magnet of an N-S pole thereof is in the axial direction of said electric motor and the diameter thereof is smaller than those of said disc-shape rotor elements, said disc-shape rotor elements are assembled concentrically with each other so as to make respective first tooth protrusions coincide with each other in said axial direction, said permanent magnet is fixed concentrically between said disc-shape rotor elements, said detection stator is comprised of a pair of stator cores, said stator core is comprised of an annular portion and a plurality of stator teeth for collecting magnetic flux flowing through said first tooth protrusions of said detection rotor, said stator teeth are formed at regular intervals on the inner circumference of said annular yoke, each of said stator teeth has inner end portion on which a plurality of second tooth protrusions are formed, said stator cores are assembled concentrically with each other with a gap in said axial direction between them so as to make respective second tooth protrusions of said stator teeth coincide with each other in said axial direction, said magnetic flux concentration tips are placed in said gaps in said axial direction for concentrating magnetic flux in said gaps in said axial direction, said magneto electro transducers are placed in said gaps in said axial direction for transforming said magnetic flux into electrical signals, said detection rotor and said detection stator are assembled so as to make said first tooth protrusions of said detection rotor and said second tooth protrusions of said stator teeth of said detection stator oppose with each other with a gap in the radial direction of said electric motor between them, wherein the magnetic pole position of said electric motor is detected by measuring the magnetic flux flowing through said stator teeth that varies in accordance the rotation of said detection rotor.

2. A magnetic pole position detector for an electric motor according to claim 1, wherein said magnetic flux concentration tips are placed in all said gaps in said axial direction.

3. A magnetic pole position detector for an electric motor according to claim 1 or 2, wherein a number of pairs of stator teeth is 3n (n being an even number greater than or equal to 2), each of six pieces in 3n pieces of said magnetic flux concentration tips is placed in respective one of said gaps in said axial direction between said stator teeth positioned at a reference position and positions 60°, 120°, 180°, 240° and 300° in electrical angle apart from said reference position, so as to make the magnetic reluctance variations between said first tooth protrusion of said detection rotor and said second tooth protrusions of said stator teeth successively occur with a phase difference of an electrical angle of 60° relative to each preceding one.

4. A magnetic pole position detector for an electric motor according to claim 1 or 2, wherein a number of pairs of stator teeth is 2n (n being an even number greater than or equal to 2), each of four pieces in 2n pieces of said magnetic flux concentration tips is placed in respective one of said gaps in said axial direction between said stator teeth positioned at a reference position and positions 90°, 180° and 270° in electrical angle apart from said reference position, so as to make the magnetic reluctance variations between said first tooth protrusion of said detection rotor and said second tooth protrusions of said stator teeth successively occur with a phase difference of an electrical angle of 90° relative to each preceding one.

5. A magnetic pole position detector for an electric motor according to claim 1 or 2, wherein a number of pairs of stator teeth is 5n (n being an even number greater than or equal to 2), each of ten pieces in 5n pieces of said magnetic flux concentration tips is placed in respective one of said gaps in said axial direction between said stator teeth positioned at a reference position and positions 36°, 72°, 108°, 144°, 180°, 216°, 252°, 288° and 324° in electrical angle apart from said reference position, so as to make the magnetic reluctance variations between said first tooth protrusion of said detection rotor and said second tooth protrusions of said stator teeth successively occur with a phase difference of an electrical angle of 36° relative to each preceding one.

6. A magnetic pole position detector for an electric motor according to claim 1, wherein a pair of output voltage waves of said magneto electro transducers placed with an electrical angle of 360° and mechanical angle of 180° apart are averaged.

7. A magnetic pole position detector for an electric motor according to claim 1, wherein said annular yoke portion is composed of a non-magnetic material.

8. A magnetic pole position detector for an electric motor according to claim 1, wherein open holes are formed in said annular yoke portion at the roots of said stator teeth and at the places between the adjacent roots of said stator teeth.

9. A magnetic pole position detector for an electric motor according to claim 1, wherein a pair of output voltage waves of said magneto electro transducers placed with an electrical angle of 180° apart are compared and points of intersection of said output voltage waves are detected.

10. A magnetic pole position detector for an electric motor according to claim 9, wherein a reference amplitude which is an amplitude of said output voltage wave of a magneto electro transducer arbitrary chosen from 2n (n is a positive integer) pieces of said magneto electro transducers composing n pairs of said magneto electro transducers, of which each of said pair of said magneto electro transducers are placed with an electrical angle of 180° apart with each other, is defined, and amplitudes of said output voltage waves of (2n−1) pieces of said magneto electro transducers not chosen are adjusted so as to be equal to said reference amplitude by a regulator circuit, and said points of intersection of adjusted output voltage waves are detected.

11. A magnetic pole position detector for an electric motor according to claim 10, wherein said regulator circuit comprising an amplifiers for amplifying voltages of said output voltage waves and a variable resistors for adjusting output voltages of said amplifiers.

12. A magnetic pole position detector for an electric motor according to claim 11, wherein said variable resistor comprising a plurality of semi-conductor resistor devices and nonvolatile memory devices, resistance values of said variable resistor are controlled by selecting nodes of said semi-conductor resistor devices by pulse signals, and said resistance values are stored in said nonvolatile memory devices.

13. A magnetic pole position detector for an electric motor according to claim 11, wherein said variable resistor is adjusted so as to make duty factor of output pulses of said magnetic pole position detector 50%.

14. A magnetic pole position detector for an electric motor according to claim 11, wherein said detection rotor is driven in constant rotational speed by said electric motor, said magnetic pole position detector has an automatic regulator circuit for processing output pulses of said magnetic pole position detector to detect duty factors of said output pulses and generating pulse signals corresponding to the difference between said duty factors and a reference duty factor, and said variable resistors are controlled by said pulse signals.

15. A magnetic pole position detector for an electric motor according to claim 1, wherein said stator cores are made of a magnetic material, a printed circuit board is attached to an outer surface of said stator core, each of said magnetic flux concentration tip is composed of a pair of magnetic flux concentration protrusions, and each of said magneto electro transducers is placed between said pair of magnetic flux concentration protrusions with the magnetism sensitive plane of said magneto electro transducer approximately parallel to the surface of said printed circuit board.

16. A magnetic pole position detector for an electric motor according to claim 15, wherein a plurality of guides for guiding said printed circuit board are formed protruding on said outer surface of said stator core.

17. A magnetic pole position detector for an electric motor according to claim 16, wherein lead foils are printed on an surface of said printed circuit board, guide holes of circular arc form opposing said guides and eye holes for ascertaining the positions of said magneto electro transducers are formed in said printed circuit board, and each of said magneto electro transducers is fixed between said pair of magnetic flux concentration protrusions close to the corresponding one of said eye holes with the magnetism sensitive plane of said magneto electro transducer approximately parallel to the surface of said printed circuit board.

18. A magnetic pole position detector for an electric motor according to claim 17, wherein said printed circuit board is placed on said outer surface of said stator core with each of said guides inserted into respective said guide holes of circular arc form, without bringing said magneto electro transducers into contact with said stator teeth, then said printed circuit board is rotated along said guide holes of circular arc form to make each of said magneto electro transducers placed between said pair of magnetic flux concentration protrusions, and then said printed circuit board is fixed.

19. A magnetic pole position detector for an electric motor according to claim 15, wherein soldering points for electronic parts with lead legs and surface mounting electronic parts are concentrated on a surface of said printed circuit board on which lead foils are printed.

20. A magnetic pole position detector for an electric motor according to claim 15, wherein said stator cores are combined in said axial direction with a spacer made of a non-magnetic material between them, then said second tooth protrusions with predetermined dimensions are machined.

21. A magnetic pole position detector for an electric motor comprising a detection rotor, a detection stator, magnetic flux concentration tips and magneto electro transducers, said detection rotor is fixed to a rotatable shaft of said electric motor and comprised of a cylindrical permanent magnet with multiple magnetization on its circumference, said detection stator is comprised of a pair of stator cores, said stator core is comprised of an annular portion and a plurality of stator teeth for collecting magnetic flux flowing through said first tooth protrusions of said detection rotor, said stator teeth are formed at regular intervals on the inner circumference of said annular yoke, each of said stator teeth has inner end portion on which a plurality of second tooth protrusions are formed, said stator cores are assembled concentrically with each other with a gap in said axial direction between them so as to make respective second tooth protrusions of said stator teeth coincide with each other in said axial direction, said magnetic flux concentration tips are placed in said gaps in said axial direction for concentrating magnetic flux in said gaps in said axial direction, said magneto electro transducers are placed in said gaps in said axial direction for transforming said magnetic flux into electrical signals, said detection rotor and said detection stator are assembled so as to make said first tooth protrusions of said detection rotor and said second tooth protrusions of said stator teeth of said detection stator oppose with each other with a gap in the radial direction of said electric motor between them, wherein the magnetic pole position of said electric motor is obtained by detecting the magnetic flux flowing through said stator teeth that varies in accordance the rotation of said detection rotor, said stator cores are made of a magnetic material, a printed circuit board is attached to an outer surface of said stator core, each of said magnetic flux concentration tips is composed of a pair of magnetic flux concentration protrusions, and each of said magneto electro transducers is placed between said pair of magnetic flux concentration protrusions with the magnetism sensitive plane of said magneto electro transducer approximately parallel to the surface of said printed circuit board.

22. A magnetic pole position detector for an electric motor according to claim 21, wherein a plurality of guides for guiding said printed circuit board are formed protruding on said outer surface of said stator core.

23. A magnetic pole position detector for an electric motor according to claim 22, wherein lead foils are printed on an surface of said printed circuit board, guide holes of circular arc form opposing said guides and eye holes for ascertaining the positions of said magneto electro transducers are formed in said printed circuit board, and each of said magneto electro transducers is fixed between said pair of magnetic flux concentration protrusions close to the corresponding one of said eye holes with the magnetism sensitive plane of said magneto electro transducer approximately parallel to the surface of said printed circuit board.

24. A magnetic pole position detector for an electric motor according to claim 23, wherein said printed circuit board is placed on said outer surface of said stator core with each of said guides inserted into respective said guide holes of circular arc form, without bringing said magneto electro transducers into contact with said stator teeth, then said printed circuit board is rotated along said guide holes of circular arc form to make each of said magneto electro transducers placed between said pair of magnetic flux concentration protrusions, and then said printed circuit board is fixed.

25. A magnetic pole position detector for an electric motor according to claim 21, wherein soldering points for electronic parts with lead legs and surface mounting electronic parts are concentrated on a surface of said printed circuit board on which lead foils are printed.

26. A magnetic pole position detector for an electric motor according to claim 21, wherein said stator cores are combined in said axial direction with a spacer made of a non-magnetic material between them, then said second tooth protrusions with predetermined dimensions are machined.

* * * * *